United States Patent
Miller, IV et al.

(10) Patent No.: US 10,914,991 B2
(45) Date of Patent: Feb. 9, 2021

(54) METHOD FOR PRODUCING A FLEXIBLE ELECTRO-OPTIC CELL

(71) Applicant: ALPHAMICRON INCORPORATED, Kent, OH (US)

(72) Inventors: Roy E. Miller, IV, Stow, OH (US); Christine Baker, Munroe Falls, OH (US); Ludmila Sukhomlinova, Kent, OH (US); Eui-Yeul Park, Hudson, OH (US); William Ryan, Kent, OH (US); Bahman Taheri, Shaker Heights, OH (US); Paul Luchette, Kent, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 0 days.

(21) Appl. No.: 16/557,235

(22) Filed: Aug. 30, 2019

(65) Prior Publication Data

US 2020/0004064 A1    Jan. 2, 2020

Related U.S. Application Data

(63) Continuation-in-part of application No. 15/526,023, filed as application No. PCT/US2015/058737 on Nov. 3, 2015, now Pat. No. 10,401,690.

(Continued)

(51) Int. Cl.
*G02F 1/1341* (2006.01)
*G02F 1/13* (2006.01)
(Continued)

(52) U.S. Cl.
CPC .......... *G02F 1/1341* (2013.01); *G02F 1/1303* (2013.01); *G02F 1/1337* (2013.01);
(Continued)

(58) Field of Classification Search
CPC ................. G02F 1/1341; G02F 1/1303; G02F 1/133305; G02F 1/133351;
(Continued)

(56) References Cited

U.S. PATENT DOCUMENTS

| 4,435,047 A | ‡ | 3/1984 | Fergason | C09K 19/544 264/4 |
| 4,647,157 A | ‡ | 3/1987 | Chiklis | G02F 1/1339 349/103 |

(Continued)

FOREIGN PATENT DOCUMENTS

| EP | 1 072 931 A2 | ‡ | 1/2001 | |
| EP | 2042915 A1 | | 4/2009 | G02F 1/1334 |

(Continued)

OTHER PUBLICATIONS

International Search Report dated Feb. 4, 2016 in related application No. PCT/US2015/058737.

(Continued)

*Primary Examiner* — Donald L Raleigh
(74) *Attorney, Agent, or Firm* — Renner Kenner Greive Bobak Taylor & Weber

(57) ABSTRACT

Provided is a flexible cell unit and a method of manufacturing the same. The cell unit includes first and second substrates separated by a controlled distance maintained by spacers, filled with an electro-optic material and enclosed by a border seal. The method includes providing two sheets to form the first and second substrates, where at least one of the sheets is flexible, depositing an electro-optic material on at least one substrate, and roll-filling the cell by using one or more lamination rollers to pair the first and second substrates to within the controlled distance of each other and filling the controlled distance with the electro-optic material.

31 Claims, 12 Drawing Sheets

Related U.S. Application Data

(60) Provisional application No. 62/080,630, filed on Nov. 17, 2014.

(51) Int. Cl.
  G02F 1/1333 (2006.01)
  G02F 1/1339 (2006.01)
  G02F 1/1343 (2006.01)
  G02F 1/1337 (2006.01)

(52) U.S. Cl.
  CPC ...... *G02F 1/13392* (2013.01); *G02F 1/13394* (2013.01); *G02F 1/13439* (2013.01); *G02F 1/133305* (2013.01); *G02F 1/133351* (2013.01); *G02F 1/133377* (2013.01); *G02F 2001/13398* (2013.01); *G02F 2001/133354* (2013.01)

(58) Field of Classification Search
  CPC .......... G02F 1/133377; G02F 1/13392; G02F 1/13394; G02F 2001/133354; G02F 1/1339
  See application file for complete search history.

(56) References Cited

U.S. PATENT DOCUMENTS

| | | | | |
|---|---|---|---|---|
| 4,904,056 A | * | 2/1990 | Castleberry | G02F 1/133512 349/110 |
| 5,623,280 A | * | 4/1997 | Akins | G02F 1/13338 345/104 |
| 5,683,838 A | ‡ | 11/1997 | Iijima | G02F 1/135 156/26 |
| 5,868,892 A | ‡ | 2/1999 | Klima, Jr. | B32B 38/10 156/25 |
| 5,943,113 A | ‡ | 8/1999 | Ichihashi | G02F 1/1341 349/12 |
| 5,978,065 A | | 11/1999 | Kawasumi et al. | 349/188 |
| 6,222,603 B1 | ‡ | 4/2001 | Sakai | G02F 1/1339 349/153 |
| 6,459,467 B1 | ‡ | 10/2002 | Hashimoto | B32B 17/10018 349/15 |
| 6,618,113 B1 | ‡ | 9/2003 | Ulrich | G02F 1/133377 349/156 |
| 6,784,953 B2 | ‡ | 8/2004 | Liang | C09K 19/544 349/15 |
| 7,081,180 B2 | ‡ | 7/2006 | Chen | B32B 37/20 156/26 |
| 7,351,506 B2 | ‡ | 4/2008 | Schneider | C09K 19/544 252/29 |
| 7,649,674 B2 | ‡ | 1/2010 | Danner | G02F 1/161 359/29 |
| 7,850,867 B2 | ‡ | 12/2010 | Liang | C08G 77/38 252/18 |
| 8,098,361 B2 | | 1/2012 | Takahashi et al. | 349/158 |
| 8,277,587 B2 | ‡ | 10/2012 | Kimura | G02F 1/1303 156/64 |
| 8,715,445 B2 | ‡ | 5/2014 | Sugimoto | B32B 37/182 156/25 |
| 2001/0013920 A1 | * | 8/2001 | Hashimoto | G02F 1/1339 349/187 |
| 2002/0018173 A1 | | 2/2002 | Furukawa et al. | 349/187 |
| 2002/0124950 A1 | ‡ | 9/2002 | Klima, Jr. | B32B 38/10 156/25 |
| 2005/0211699 A1 | ‡ | 9/2005 | Faris | G02F 1/133305 219/52 |
| 2006/0256277 A1 | ‡ | 11/2006 | Rudin | B32B 7/12 349/18 |
| 2006/0279688 A1 | * | 12/2006 | Wu | G02F 1/13394 349/155 |
| 2007/0026570 A1 | ‡ | 2/2007 | Daniels | B32B 17/10036 438/10 |
| 2008/0013033 A1 | ‡ | 1/2008 | Kim | G02F 1/13392 349/155 |
| 2009/0128771 A1 | ‡ | 5/2009 | Yang | B32B 37/02 349/18 |
| 2009/0147206 A1 | ‡ | 6/2009 | Lee | G02F 1/1341 349/15 |
| 2009/0168006 A1 | | 7/2009 | Chen et al. | 349/153 |
| 2009/0231526 A1 | | 9/2009 | Yoshihara | 349/115 |
| 2011/0205482 A1 | * | 8/2011 | Goetz | C09K 19/3402 349/183 |
| 2011/0308076 A1 | | 12/2011 | Nam et al. | 29/822 |
| 2012/0044445 A1 | | 2/2012 | Monma et al. | 349/123 |
| 2013/0128211 A1 | | 5/2013 | Wang | 349/153 |
| 2013/0165010 A1 | ‡ | 6/2013 | Wang | G02F 1/1341 445/25 |
| 2014/0320777 A1 | ‡ | 10/2014 | Fukushima | G02F 1/133305 349/43 |
| 2015/0037593 A1 | * | 2/2015 | Chan | B32B 37/1292 428/426 |
| 2016/0011445 A1 | ‡ | 1/2016 | Chen | G02F 1/1337 349/110 |

FOREIGN PATENT DOCUMENTS

| | | | | |
|---|---|---|---|---|
| JP | S58140718 A | | 8/1983 | ............... G02F 1/13 |
| JP | H07325280 A | | 12/1995 | ............... G02F 1/13 |
| JP | H11119180 A | | 4/1999 | ............... G02F 1/13 |
| JP | 2004258673 A | | 9/2004 | ............... G02F 1/13 |
| JP | 2008052168 | | 3/2008 | ........... G02F 1/1341 |
| JP | 2009210719 A | | 9/2009 | ........... C03B 33/023 |
| TW | 468085 B | | 12/2001 | ........... G02F 1/1333 |
| TW | 200925745 A | | 6/2009 | ........... G02F 1/1339 |
| WO | WO 02/01284 A1 | ‡ | 1/2002 | |
| WO | WO 0201284 A1 | ‡ | 1/2002 | ......... G02F 1/13336 |
| WO | WO2008/007788 A1 | | 1/2008 | ........... G02F 1/1339 |
| WO | WO2013077812 | * | 5/2013 | ............... G02F 1/13 |

OTHER PUBLICATIONS

Written Opinion dated Feb. 4, 2016 in related application No. PCT/US2015/058737.

Wu et al.; *P-55: Cell Filling of Flexible Liquid Crystal Displays Using One Line Filling and Tilted Roller Pressing*; SID 07 Digest; pp. 393-396; 2007.

Schneider et al.; *New Developments in Flexible Cholesteric Liquid Crystal Displays*; Emerging Liquid Crystal Technologies II; Proc. of SPIE; vol. 6487, pp. 64870J-1-64870J-5; 2007.

Schneider et al.; *Flexible Encapsulated Cholesteric LCDs by Polymerization Induced Phase Separation*; SID Int. Symp. Digest Tech. Papers; vol. 36; pp. 1568-1571; 2005.

Office Action dated Feb. 9, 2018 in related U.S. Appl. No. 15/526,023 and Response thereto filed May 7, 2018.

Office Action dated Jul. 25, 2018 in related U.S. Appl. No. 15/526,023 and Response thereto filed Sep. 13, 2018.

Office Action dated Nov. 6, 2018 in related U.S. Appl. No. 15/526,023 and Response there to filed Feb. 27, 2019.

Amendment After Allowance filed Jun. 28, 2019 in related U.S. Appl. No. 15/526,023.

English translation of Decision Rejection dated Dec. 25, 2019 in related Taiwanese application No. 104136180.

\* cited by examiner
‡ imported from a related application

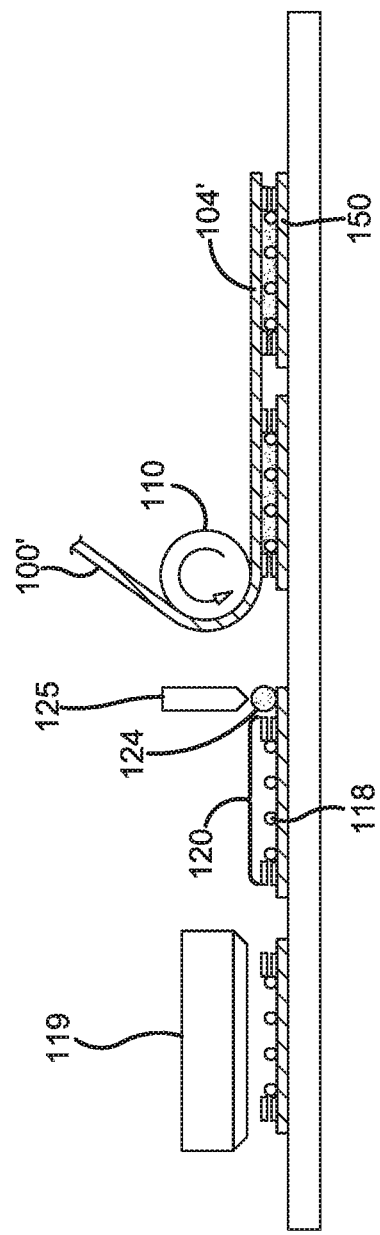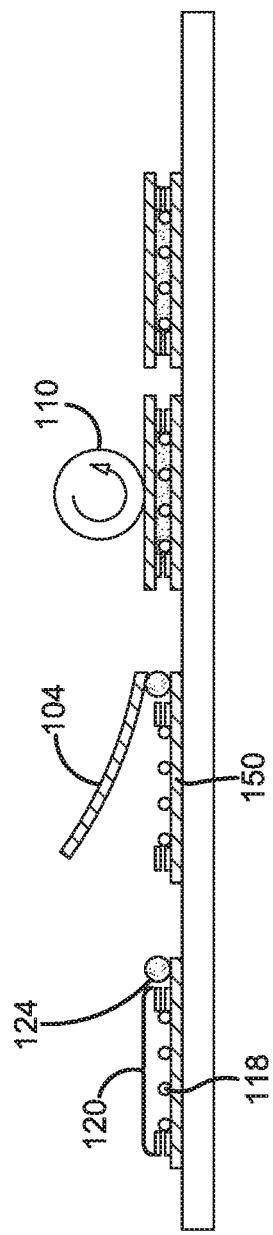

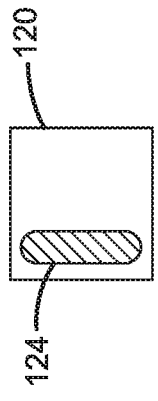
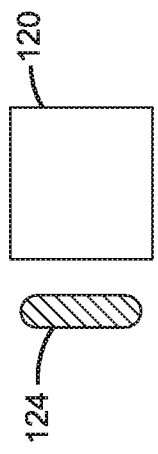
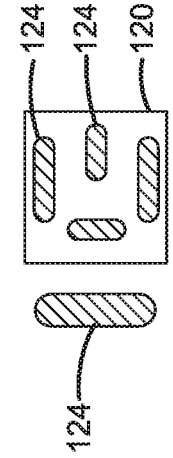
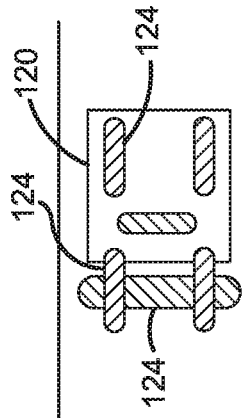
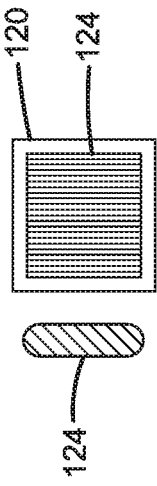
FIG. 3A  FIG. 3B  FIG. 3C  FIG. 3D  FIG. 3E  FIG. 3F

METHOD FOR PRODUCING A FLEXIBLE ELECTRO-OPTIC CELL

CROSS REFERENCE TO RELATED APPLICATIONS

This application is a continuation-in-part application of prior application Ser. No. 15/526,023 filed May 17, 2017 (U.S. Pat. No. 10,401,690), which is a § 371 application of International (PCT) application number PCT/US2015/058737 filed Nov. 3, 2015, claiming priority of U.S. Provisional application No. 62/080,630 filed Nov. 17, 2014, all of which are incorporated herein by reference.

BACKGROUND ART

Most liquid crystal (LC) devices are made from a sandwich of liquid crystal between two spaced glass substrates coated with a transparent conductor. The glass substrates are generally held together to a predetermined gap using an epoxy-based gasket (edge seal) at the edge and are referred to as a panel. The liquid crystal is injected into the gap of the panel using either a vacuum filling process or one drop filling process. In the case of vacuum filling process, the gasket around the panel is not continuous and has an opening referred to as "fill hole". The panel is then placed in a vacuum chamber to vacate the air from within the panel. After this step, and while still under vacuum, liquid crystal is introduced to the fill hole. The liquid crystal then fills the gap inside the panel due to capillary forces. This may be accelerated by bringing the panel to atmospheric pressure after the liquid crystal introduction to the fill hole. The process is completed once the liquid crystal has filled the panel gap. However, to avoid future problems (e.g. shrinkage, formation of bubbles, etc.) the amount of liquid crystal in the panel is more than the anticipated volume. As such, the panels are then pressed to remove the excess liquid crystal by a process referred to as "cold pressing". The fill hole is then sealed using a secondary epoxy to avoid air from entering the panel.

This process is difficult to execute in large area panels because the filling time is proportional to the panel area, so the waiting time needed for the filling to complete may take several hours for each panel. This process is uneconomical, especially with the additional time required to vacate the air in the vacuum process. Furthermore, the control of cell gap becomes exceeding difficult.

The use of flexible substrates in the traditional vacuum process poses another difficulty. When air in the chamber is vacated any trapped air in the empty cell causes the empty cell to expand, much like a balloon. This could lead to damage of the cell or breaking of the cell gasket. Extra precautions are needed, such as sandwiching the flexible cell between two ridged materials to prevent ballooning, for the vacuum fill process.

To mitigate this, a new process, referred to as one drop filling (ODF) was invented. In this process, the glass substrate is coated. A gasket is deposited around the entire perimeter of the glass substrate. The substrate is then placed in a large vacuum chamber. A second glass substrate is also placed in the vacuum chamber and is held above the original substrate. At this point, a dispenser deposits the exact amount of liquid crystal that will be needed on the bottom glass substrate. Once vacuum state is achieved, the two substrates are brought together. The epoxy gasket is cured creating a sealed system. The liquid crystal fills this panel through capillary forces. The panel can be brought to atmospheric pressure to accelerate the filling process as before. The advantage of the ODF method is that the cold press step is omitted. Furthermore, the system can reduce the process time, especially for large area panels.

An important aspect of these processing methods is that the final panel is considered to be under negative pressure. In other words, since the panel is fabricated under vacuum, the inside pressure is considered to be lower than the atmospheric pressure. This means that air will penetrate the panel if given the opportunity. Therefore a breach in the gasket will result in catastrophic failure of the panel. To avoid this problem, the gaskets are designed to be impenetrable to air.

Glass based panels cannot be used in applications in which durability, flexibility, or light-weight is of importance. Such applications include eyewear, protective shields, highly curved windows/displays, etc. Therefore, there is a demand for flexible plastic LC devices.

The manufacturing methods used for liquid crystal panel fabrication are not fully compatible with plastic substrates. For one thing, plastic is flexible, making the handling of plastic substrates particularly difficult in fabrication processes. The lack of flexibility of glass which is considered a drawback for many applications is in fact necessary for the fabrication processes stated above. While some small area plastic cells have been made using conventional processes above, the low yields have limited their introduction. This is primarily due to the stringent conditions needed for any vacuum filling process. Furthermore, once the panel is fabricated, the plastic based devices have a significantly lower lifetime. This is due to the fact that plastics are permeable materials, allowing transfer of gasses. Since the panels are fabricated under negative pressure, air will eventually enter the cell. This has significantly limited introduction of plastic based liquid crystal devices. While many companies (e.g. Teijin, DuPont, Mitsubishi etc.) have been working on hard coats to reduce the gas permeability of plastic substrates, they have not yet reached the values offered by even the thinnest glass.

Some liquid crystal devices based on plastic have emerged in the market. They attempt to overcome these issues by processing the system in atmospheric pressure. A method of achieving this is to eliminate the gasket seal and use a roller to place the liquid crystal on the substrates. However, to avoid the liquid crystal from coming out of the panel because of lack of gasket seal, they introduce a significant amount of polymer in the liquid crystal. In this method, the liquid crystal material is "encapsulated," meaning a quantity of liquid crystal material is confined or contained in an encapsulating medium. Such microencapsulation prevents the liquid crystal from "flowing," making manufacture of large displays possible. The polymer encapsulated liquid crystal creates micro "panels" within the large panel. The polymer also helps maintain the cell gap by adhering to the two substrates. These materials most commonly known as Polymer Dispersed Liquid Crystal (PDLC), Nematic Curvilinear Aligned Phase (N-CAP), Polymer Stabilized Cholesteric Texture (PSCT), Polymer Encapsulated Liquid Crystal (PELC), and Polymer Network Liquid Crystal (PNLC), etc. have a significant drawback in that they do not exhibit optical clarity and are hazy due to light scattering by the encapsulated liquid crystal domains. This has limited their use to privacy applications (e.g. privacy windows, etc.). It should be noted that these systems lack the stability of the glass panels because of absence of the gasket. In particular, air and moisture penetrates the panel over time and renders the product inoperable. As such, these systems have not achieved marketability. To overcome this limitation, the encapsulation size by the polymer was increased. Furthermore, patterned micropanels were created to limit the flow of the liquid crystal in the final large panel. However, these additional structures reduce the optical performance of the cell and create additional effects such as diffraction. In optical device applications, a device without the presence of these polymer walls and structures are needed to avoid any optical artifacts in the viewing area.

Other proposed solutions include, e.g., US Patent Application 2009/0128771, entitled "Fabrication Methods for Liquid Crystal Display Devices" (Yang et al.), which describes a roll-to-roll method of manufacturing cells using a "patterned enclosure structure" that includes a plurality of stripes for dividing liquid crystals. Another method uses patterned micro-polymer spacers to contain LC material within small confined spaces. For example in a method described in Wen-Tuan Wu et al. "P-55: Cell filling of Flexible Liquid Crystal Displays Using One Line Filling and Tilted Roller Pressing", *SID* 07 *Digest*, p 393 (2007), micro-polymer spacers that are 10 μm wide×170 μm long×3 μm high are formed on one substrate in order to contain the liquid crystal material in small, rectangular spaces, therefore making manufacture of a large cell possible. Other examples of patterned spacers include the method of Liang et al., U.S. Pat. No. 7,850,867 entitled "Compositions for liquid crystal display."

Other methods include providing a "support layer" made of a material capable of absorbing or binding LC material so as to make the LC layer dimensionally stable in thickness and of sufficient thickness to perform. See U.S. Pat. No. 5,868,892.

While plastic substrates lend themselves to a roll-to-roll type of manufacturing with reduced costs and increased manufacturing efficiency, previous efforts to implement a roll-to-roll continuous manufacturing process for various flexible displays have not been successful. The manufacture of large surface area flexible displays has been particularly illusive. One reason is that in liquid crystal devices, such as displays or optical devices, it is essential that the liquid crystal layer (i.e. the liquid crystal material together with any dyes mixed therein) have an optimum uniform thickness, because variations in thickness cause variations or gradations in optical properties of the liquid crystal device. In addition, the varying thickness of the liquid crystal material will cause corresponding variations in the electrical properties of the liquid crystal material, such as capacitance and impedance, further reducing uniformity of a liquid crystal device, especially one with a large size. The varying electrical properties of the liquid crystal material may also cause a corresponding variation in the effective electric field applied across the liquid crystal material. Additionally, in response to a constant electric field, areas of the liquid crystal that are of different thicknesses would respond differently. Thus, there should also be an optimum spacing of the electrodes by which the electric field is applied to the liquid crystal material. To maintain such optimum thickness and spacing, rather close tolerances must be maintained. To maintain close tolerances, there is a limit as to the size of the device using such liquid crystals, for it is quite difficult to maintain close tolerances over large surface areas. In addition, the amount of liquid crystal must be controlled as is the case in vacuum based processing. However, in a rolled based plastic process, the presence of vacuum is best avoided for the reasons stated above.

For these reasons, large size single cell liquid crystal devices, such as for example a sunroof or window, have not been made satisfactorily, mainly because of the fluidity of the liquid crystals, i.e. the tendency of the material to flow, creating areas that have different material thicknesses resulting in non-uniform optical and electrical characteristics.

Generally, it has been conventional thought that other than using the various encapsulation/patterned spacer methods described here, it is not possible to make a flexible cell filled with a fluid electro-optical mixture, such as a twisted-nematic liquid crystal, using a roll-to-roll, roll to sheet, roll to part or continuous manufacturing process. This is because of the difficulty of working with flexible plastics, having to maintain a controlled distance between the two substrates at about 5-20 μm with only a small variation; the precision required to fill the controlled gap between the top and bottom substrates with an amount of liquid crystal sufficient to fill the entire gap without forming bubbles or defects; and the fluid nature of the liquid crystal, which requires either having to stabilize the LC material using polymerization or encapsulation, and/or having to use spacers that can form discrete patterns, all of which result in "haze" which is undesirable.

Therefore, there remains a demand for an efficient manufacturing method for cells having at least one flexible substrate and using a substantially polymer-free electro-optic material.

SUMMARY OF THE INVENTION

Disclosed herein is a method of producing a flexible cell unit (i.e. a cell having two substrates sandwiching an electro-optic material where at least one of the substrates is flexible) enclosed by a frame-like border seal, and cell units produced using the described method. The flexible cell unit has substrates separated by a controlled distance maintained by spacers that are assembled together and roll-filled with an electro-optic material (EOM). The term "roll-filled" and "roll-filling" as used herein refers to filling the space between the flexible substrates or the active area of the cell with the EOM using one or more lamination rollers so that the electro-optic material completely fills the controlled distance between the substrates. In some embodiments, the roll-filling is achieved without using vacuum (vacuum-less method). As used herein vacuum-less means without using vacuums conditions used in conventional LCD manufacturing, which is usually around 10 miliTorr (mTorr). Therefore, a vacuum-less roll-filling can be performed under pressure greater than 10 mTorr.

In some instances, the method can result in a continuous production process.

The method uses two sheets of material to form two substrates. In some embodiments, one or both sheets are continuous sheets (or rolls) of flexible plastic or glass. In some embodiments, one or both sheets are discrete (i.e. separated from each other) and at least one is made of a flexible material, while the other substrate may be flexible or made of a rigid (glass or plastic) material.

In some embodiments, the EOM is deposited on an area outside the perimeter of the border seal and is pushed into the active area (inside the border seal of the cell unit) by the process of roll-filling.

In some embodiments, the electro-optic material is non-discrete non-encapsulated, non-polymeric, and contains less than 10% polymerizable material.

In some embodiments, the spacers are unpatterned. The spacers can also include an adhesive material.

In some embodiments, the cell unit can have, in addition to the spacers, adhesive gap control (AGC) means that aid in the adhesion of the two substrates and maintenance of the controlled distance. The AGCs can include one or more elements including polymeric or adhesive bridges, partition walls, pillars, or a combination thereof.

In one embodiment, the method includes: providing two continuous sheets of flexible plastic material to form a first (e.g. bottom) substrate and a second (e.g. top) substrate; depositing an electro-optic material on the first substrate; using a lamination roller to mate the second substrate with the first substrate and to roll-fill the cell (or sheet) with the electro-optic material so that the electro-optic material fills the controlled distance between the first and second substrates. The border sealant may be applied before the step of depositing the EOM or after the EOM has been deposited.

In other embodiments, the method includes providing one continuous sheet of flexible material to form one substrate, and a flexible or rigid discrete sheet to form the other substrate; then depositing the EOM on one substrate and using one or more lamination rollers to roll-fill the controlled distance between the cells.

In yet other embodiments, the method includes providing a discrete sheet of flexible material to form one substrate, and another discrete sheet of material (which may be flexible or rigid) to form the other substrate. The substrates are subsequently roll-filled as described herein.

In some embodiments, a border sealant is applied before the roll-filling step, so the method includes the step of applying a border sealant on the first and/or the second or both substrates before depositing the EOM, and a step of curing the border sealant to form the border seal before or after the roll-filling step. For example, the curing can be carried out in two or more steps, where there is a pre-cure step (before the roll-filling step) to partially cure the border sealant, followed by one or more curing stapes after the roll-filling step in order to complete the border sealant curing process. In this method of applying the border sealant before the roll-filling step, the electro-optic material can be deposited on an area outside the perimeter of the border sealant (FIG. 3A). Alternatively, the electro-optic material can be deposited inside the perimeter of the border seal (FIG. 3B). In other embodiments, the EOM may be deposited both outside and inside the perimeter formed by the border sealant, in one or a variety of shapes. (FIG. 3C-F).

In some embodiments, a border seal is formed before the step of roll-filling where the border seal perimeter has at least one opening (i.e. is not complete). The area inside the border seal is roll-filled with an EOM and the border seal opening is sealed after the roll-filling step. In this example, the opening in the border seal perimeter allows the extrusion of any excess EOM material.

This method can have a further step of cutting the flexible cell unit from the two continuous sheets of flexible plastic material using a mechanical cutter (e.g. a xy-cutter or die cutter), or a laser cutter, or a combination thereof, or any other cutting/separation technique known in the art.

It may be advantageous in some cases for the border sealant to be printed on both the top and bottom substrates. In this embodiment, during the roll-filling process EOM flows between the top and bottom border sealants rather than strictly over the bottom border sealant. This ensures that the border sealant has contact to each substrate surface. This promotes adhesion and stability of the seal.

In some cases, more than one border sealant may be applied, e.g. two or more types of adhesive may be employed to provide the border seal, each adhesive providing a different functionality, e.g. an adhesive function vs. a non-interacting function.

In other embodiments, the EOM is applied first, then the border sealant is applied and the cell is roll-filled. In one embodiment, the border sealant is cured (at least partially) before the roll-filling step. In another embodiment, the border sealant is cured after the roll-filling step.

When a border sealant is present, it has a viscosity >1000 centipoise (cP), >2000 cP, >3000 cP, >4000 cP, or >5000 cP. In some embodiments, the viscosity is less than 10,000 cP, 20,000 cP, 30,000 cP, 40,000 cP, 50,000 cP, 60,000 cP or 70,000 cP. In some embodiments, the viscosity is less than 100,000, 200,000, 300,000, 400,000 or 500,000 cP. In some embodiments, the ratio of the border seal viscosity to EOM viscosity is greater than 5, 6, 7, 8, 9, 10, 20, 30, 40, or 50.

In some embodiments of this method, the electro-optic material does not chemically interact or interacts only minimally with the border sealant. In some examples, multiple (i.e. more than one) border sealants may be applied to one or both substrates.

In another embodiment, a border seal is created after the roll-filing step using a laser or heating element or similar welding method used to seal around the roll-filled cell. The laser is able to melt the top and bottom substrates together to form a continuous seal around an active area. The laser can also be configured to simultaneously cut an individual cell from a sheet while creating the seal. The steps in this method include: providing two continuous sheets of flexible plastic material to form the first (bottom) substrate and the second (top) substrate; depositing an electro-optic material on the first (or second) substrate; using a lamination roller to mate the second substrate with the first substrate to form a cell filled with the electro-optic material and having a controlled distance maintained by unpatterned spacers; then laser cutting a shape to form a border seal and to separate the flexible cell unit from the two sheets of material. In this method, a border sealant is not applied before the roll-filling step. Rather, the border seal is created after the roll-filling step.

In any of the methods described above, the sheets of flexible plastic may be pre-coated with spacers, or the process can further include a step where the spacers are applied onto the first substrate, or the second substrate, or both. In yet other embodiments, the spacers may be deposited within the electro-optic material. Or, alternatively, the spacers may be deposited within an alignment layer on the first substrate, the second substrate, or both. In some examples, the spacers are unpatterned.

In some examples, the spacers may be printed onto one or both substrates. The distribution of the spacers must be such that they produce only minimal or no diffraction patterns. Therefore the term "unpatterned spacers" refers to spacers with a random or a non-diffraction producing pattern.

Moreover, in most examples described herein, the spacer count (or density of the spacers) is more than 10, 20. 30, 40, 50. 60. 70 or 80 per square mm.

In any of the embodiments described above, the substrates may include a conductive layer (e.g. indium tin oxide or ITO) for application of a voltage or electric current to the electro-optic material. Accordingly, the sheets of flexible plastic may be pre-coated with a conductive layer, or the process can further include a step where conductive layer is applied to the first and second substrates.

In some examples, the conductive layer (e.g. ITO) may have regions that are segmented to create sub-cells or segments inside the cell unit, wherein each segment can be activated separately from other segments. As used herein, a "segment" means an ITO area with a resolution of less than 100 dots per inch (dpi). In other words, each inch has less than 100 segments.

The first and second substrates may also include an alignment layer to assist with alignment of the EOM molecules. The alignment layer may already be present on the sheets of material or substrates (pre-coating). Alternatively, the method may include a step of depositing the alignment layer on the first substrate, the second substrate, or both. The alignment layer may be applied to the entire surface of the first or second substrate sheets or applied selectively to a selected active area on one or both first and second substrates. Active area refers to the area on the substrate that is to be filled by the electro-optic material and bordered by the border seal. Selective application may be achieved using various techniques, for example, screen printing, inkjet printing, planar coating, roller pressing, thermal pressing, phase separation out of a mixture or other methods known in the art. In some cases, this is a self-assembling monolayer that can produce a desired alignment.

In some embodiments, the alignment layer may contain spacers that maintain the controlled distance between the substrates.

The electro-optic material includes any material that can be altered by the application of an electric current or voltage. Examples include liquid crystals, electro-chromic materials, SPD etc.

In some embodiments, the electro-optic material as a whole is not polymerizable and non-encapsulated or does not contain more than 1%, 2%, 3%, 4%, 5%, 6%, 7%, 8%, 9% or 10% polymerizable material. In some examples, the electro-optic material includes a non-polymerizable, non-encapsulated liquid crystal, or a liquid crystal-dye mixture. In some examples, the electro-optic material is a guest-host dichroic dye-liquid crystal mixture. In some examples, the EOM is non-discrete. In other embodiments, especially where the flexible cell is large, the EOM may be divided/partitioned into discrete areas by application of partition walls in addition to unpatterned spacers, to assist in maintaining the controlled distance between the substrates.

The electro-optic material can be deposited in drops, lines or shapes or sheets in continuous film on the first substrate using any deposition means known in the art. (FIGS. 3-5)

When the EOM contains a liquid crystal mixture, the substrates can be coated with an alignment layer and the method can include a step of treating the alignment layer to allow proper alignment of liquid crystal molecules (and/or dye) with the substrates. "Treated," as used here, includes any number of ways known in the art to produce a desired alignment of the liquid crystal. For example, the alignment layer polyimide (PI) could be physically rubbed with a soft cloth. Alternatively, while the PI is drying it could be aligned with air jets. Also known are photo-alignable alignment layers that induce alignment with UV light, etc.

In some embodiments, the flexible cell unit is an optical device. An "optical device" refers to a device having optical properties suitable for a user to be able to look through the device without significant distortion of the image seen through the device. An optical device, then, is distinct from a traditional display, because typically a user does not look through a display at an image. Examples of optical devices include glasses, goggles, visors, protective eyewear, sunroofs, windows, fenestrations, etc. In some examples the optical device has a haze value less than 15%, 10%, 7%, 5%, 3%, 2% or 1%.

In some examples, the flexible cell unit is an optical device containing a liquid crystal-dichroic dye mixture capable of switching between a high transmission "clear" state and a low-transmission "dark" state with application of different voltages. Such guest-host liquid crystal-dye mixtures are well suited to the manufacturing method disclosed herein because of the cell's relatively higher tolerance for variations in the cell gap.

One of the many advantages of the inventive method described herein is that it can be performed as a vacuum-less method. But it can also be performed under vacuum, if required.

BRIEF DESCRIPTION OF THE DRAWINGS

FIG. 2B is a schematic diagram of an embodiment of a roll-filling fabrication method of a flexible cell unit using one continuous roll of flexible substrates and one non-continuous substrate.

FIG. 2C is a schematic diagram of an embodiment of a roll-filling fabrication method of a flexible cell unit using two non-continuous sheets of flexible substrate.

FIGS. 3A-3F are schematic views of various examples of the placement of the EOM in relation to the border seal during a roll-filling process, showing examples of various EOM deposition patterns.

DETAILED DESCRIPTION OF THE INVENTION

Figure 1A:
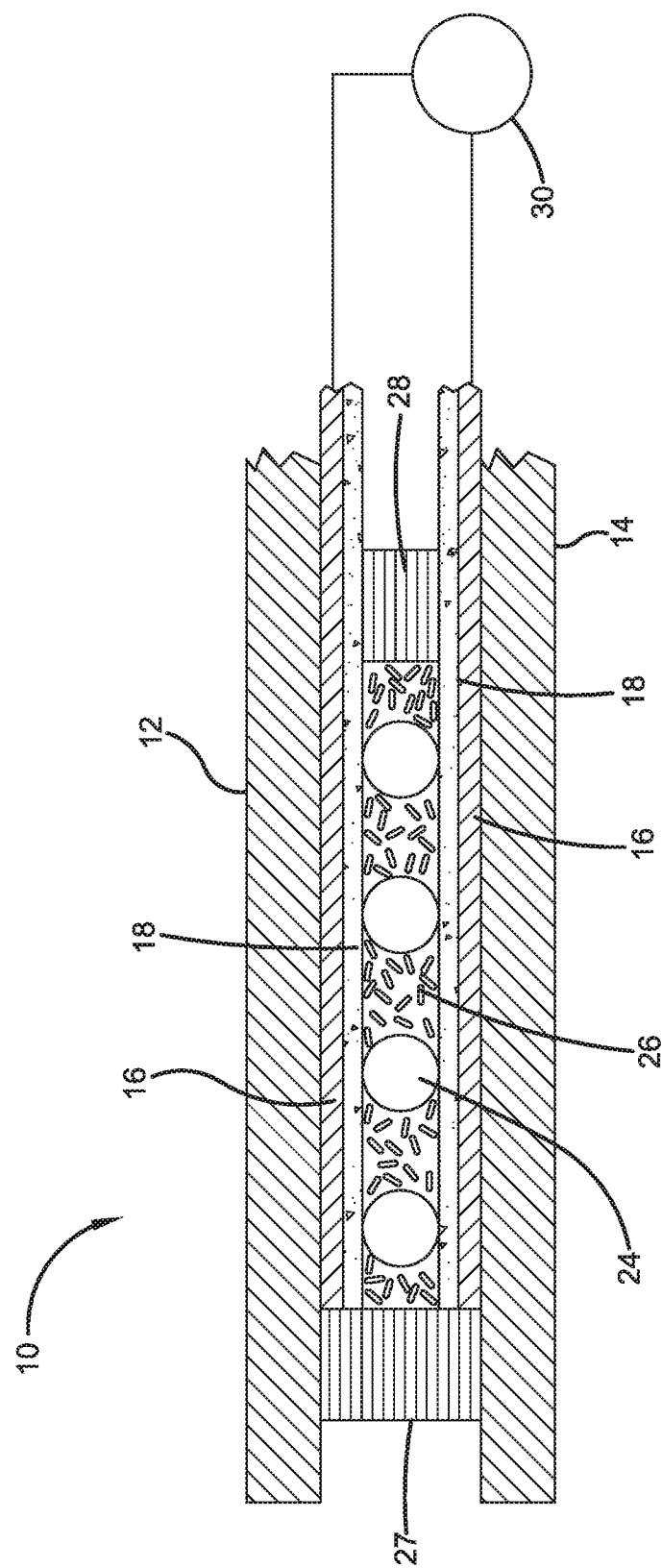
FIG. 1A is a schematic cross sectional view of a flexible cell unit.
Figure 1C:
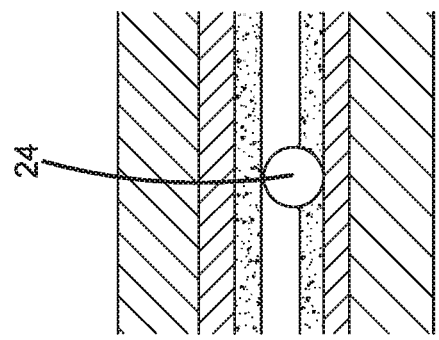
FIGS. 1B-1F are schematic cross-sectional views of a spacer in a cell unit.
Figure 1B:
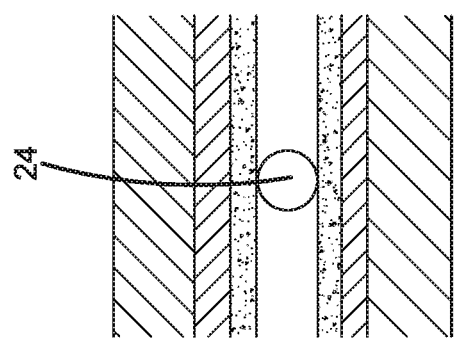
Figure 1D:
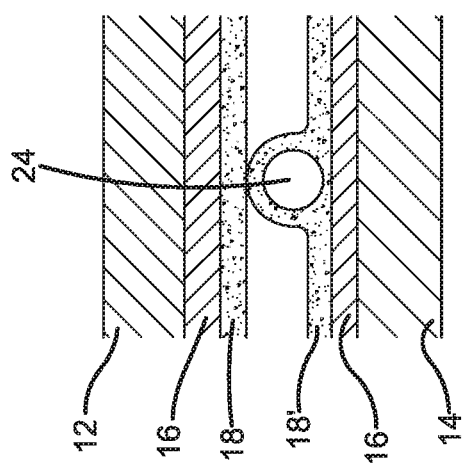

Disclosed herein is a method of producing a flexible cell unit enclosed (edge sealed) by a border seal and filled with an electro-optic material (EOM). Generally, the method includes providing two sheets, at least one the sheets made of a flexible material. One sheet forms the first substrate and the second sheet forms the second substrate. The method includes depositing or dispensing a quantity of an electro-optic material on the first substrate; and using at least one lamination roller to mate the second substrate with the first substrate and to roll-fill the cell with the electro-optic material so that the electro-optic material fills a controlled distance between the first and second substrates. The controlled distance between the two substrates is maintained by unpatterned spacers.

FIG. 1 is a schematic diagram of a flexible cell unit 10. The cell 10 includes top and bottom substrates 12, 14, respectively. Depending on the application, the substrates may be coated with a conductive layer 16. Optically clear conductive layers include Indium Tin Oxide (ITO), conductive polymers, conductive nanowires and the like. Alternatively, or in addition, the substrates may also be coated with an alignment layer 18, such as a polyimide or the like.

At least one of the substrates 12, 14 is made of a clear flexible material such as a clear plastic or glass suitable for constructing flexible cell units. Suitable plastics include, for example, polycarbonate (PC), polycarbonate and copolymer blends, polyethersulfone (PES), polyethylene terephthalate (PET), cellulose triacetate (TAC), polyamide, p-nitrophenylbutyrate (PNB), a polyetheretherketone (PEEK), a polyethylenenapthalate (PEN), polyetherimide (PEI), polyarylate (PAR), or other similar plastics known in the art. Flexible glass include materials such as Corning® Willow® Glass, etc. Many of these substrates are commercially available from e.g. Mitsubishi Plastics or Teijin DuPont films and come standard with various coatings such as hard coats. As used here, "clear" means a material having higher than 45% transmission. In some examples, the clear substrate can have a transmission of 50%, 60%, 70%, or 80%.

The substrates 12, 14 are separated by a controlled gap or distance, which is maintained by spacers 24. The volume between the substrates is filled by an electro-optic material 26.

The spacers 24 are used to maintain a controlled distance or gap between the substrates. In some embodiments, the controlled gap is 3, 4, 5, 6, 7, 8, 9, 10, 11, 12, 13, 14, 15, 16, 17, 18, 19, 20, 30, 40, 50, 60, 70, 80, 90, or 100 µm in size. In some examples, the controlled gap is preferably 5, 6, 7, 8, 9 or 10 µm, in size. A "controlled" gap or distance means the variation in the distance between the substrates should remain on the average less than 30% of spacer diameter (which determines the controlled gap). In some examples, the variation is less than 25%, 20%, 15%, 10% or 5% of the spacer diameter.

Generally, two kinds of spacers are used to maintain a controlled distance between substrates. One category are "patterned spacers", which are spacers that are either purposefully placed or created on a substrate to form a particular pattern of repeated geometry, or they are created using a photolithography/polymerization or similar method known in the art and which produce a diffraction pattern. Examples include polymer walls. Other examples include the patterned spacers used in Wen-Tuan Wu et al. "P-55: Cell filling of Flexible Liquid Crystal Displays Using One Line Filling and Tilted Roller Pressing", SID 07 Digest, p 393 (2007). Wu et al., uses a photolithography technique to form patterned micro-polymer spacers (10 µm wide×170 µm long) that are elongated to create long rows of liquid crystal. Typically, these spacers have a length and width that are larger than the cell gap, i.e., they possess an aspect ratio of long side to cell gap that is >20 in a pattern that can produce visible patterns in the device.

In contrast to the above, the present method uses "unpatterned spacers" to maintain the controlled distance between the substrates. "Unpatterned spacers", as defined herein, are spacers that are placed randomly (e.g. sprayed on) or printed where they are positioned in a way so as not to produce optical aberrations such as diffraction patterns, etc. The unpatterned spacers of the present application can be spherical or they can be oblong with an aspect ratio (length/width) less than 30/1, 20/1, 10/1 or 5/1, 4/1, or 3/1. The spacers are used to maintain a distance between the substrates of 3-100 µm, preferably 4-20 µm.

As used herein, "diffraction pattern" occurs when the periodic light pattern created by light propagation through a periodic structure with spacing of the structure being less than 100 times the wavelength of incident light, i.e. where the periodicity of the repeated pattern (e.g. of spacers or AGCs) is less than 100 times the wavelength of light.

Another distinction of the method described here is that the spacer count or density. The method works well when the substrates are covered with a greater density of smaller spacers than when long patterned spacers are placed in select locations. For example, in some embodiments, the spacer count is kept at >80 per square mm ($mm^2$).

Figure 1F:
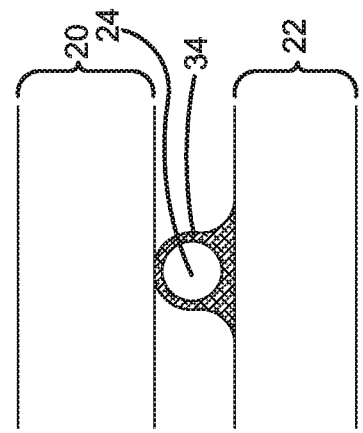
Figure 1E:
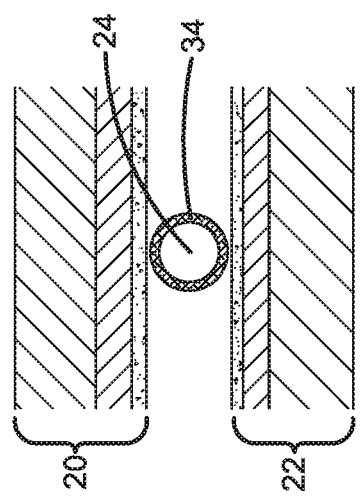

In some embodiments, the spacers 24 may be pre-applied to the substrates (e.g. the sheets are pre-coated with spacers) or may be applied to the substrates during the roll-filling process, for example sprayed on or applied in a layer where the spacers are randomly arranged or are arranged in a non-diffraction-producing pattern. They may be dispersed using a wet or dry method as known in the art. The spacers may be placed or sprayed on top of the alignment layer (FIG. 1C-1D) or may be placed within the alignment layer (FIG. 1B), during a pre-coating process or during the roll-filling manufacture process. In some embodiments, the spacers may contain and adhesive element, for example they can be coated with an adhesive layer (FIG. 1E-F). FIG. 1E shows a spacer with an adhesive coating. FIG. 1F shows a spacer with an adhesive coating that has "melted" or has "flowed" (e.g, under pressure) around the spacer.

Spherical spacers are distinct from the spherical encapsulated liquid crystals such as those described in FERGASON, Patent Application of, PCT/US1982/001240 (WO/1983/001016) entitled: "Encapsulated Liquid Crystal and Method", because they do not encapsulate any volume of the EOM.

In certain embodiments, the spacers 24 can be deposited inside or as part of the alignment layer (e.g. FIG. 1B), so that they are applied when the alignment layer is applied to one or both substrates. In other embodiments, the spherical spacers 24 can be integrated into the electro-optic material that is deposited onto the substrates.

The cell 10 further includes a border seal (edge seal) 27/28, which contains the EOM inside the cell and forms a barrier between the outside environment and the EOM, preventing the EOM from flowing out of the cell as well as preventing environmental factors (air, moisture, debris) from getting inside the cell. In some examples, the border seal is formed by applying a border sealant to one or both of the substrates, which when brought together and cured, will form the border seal around the electro-optic material contained within the cell. FIG. 1 shows the variation in the border seal depending on the various coatings on the substrates when the border sealant is applied. In FIG. 1, on one side, border sealant 27 seals the flexible substrates 12, 14 together. Alternatively, the border seal arrangement can be as pictured on the other side of the cell with border sealant 28 sealing the gap between the alignment and/or conductive layers. The particular arrangement will depend on the timing and method of the border sealant application.

In some embodiments, the border seal is formed substantially around the border of the cell but is open in at least one portion to facilitate the roll-filling process. After filling the cell with the EOM, the border seal may be closed completely (e.g. by plugging the small open portion) using various methods known in the art.

In some embodiments the border sealant has a viscosity less than 500,000, 400,000, 300,000, 200,000, 100,000, or 70,000 CentiPoise (cP). In some embodiments, the border sealant has a viscosity greater than 1000 CentiPoise (cP), 2000 cP, 3000 cP, 4000 cP, or 5000 cP during the roll-filling process. This includes thermal adhesives that decrease in viscosity when heat is used to assist the bonding, as well as thixotropic adhesives, that change viscosity in response to pressure. In some embodiments, the ratio of the border seal viscosity to EOM viscosity is greater than 5, 6, 7, 8, 9, 10, 20, 30, 40, or 50. In some examples, a border seal with a viscosity of greater than 6000 cP has been used successfully. The viscosity of the border sealant affects the integrity of the cell because if the viscosity of the border sealant is too low, it can mix with the EOM during processing promoting a chemical interaction or flowing with the liquid crystal during the roll filling process and depositing on the substrate's surface in undesired locations. If the border sealant is too viscous, the controlled gap or distance around and close to the border seal may not be uniform.

In some examples, it is advantageous if the border sealant material experiences minimal or no chemical interaction with the electro-optic material 26 over a long period of time, typically more than 6 months, more than 1 yr, more than 2 yrs, etc. For example, we found that over time (e.g. six months or greater), the sealant can deteriorate or interact with the electro-optic material (e.g. liquid crystal) inside the cell to form micro-pores that allow air to creep into the cell, thus forming bubbles or imperfections. In some examples, it is advantageous if the border sealant is non-porous to the EOM or its components. For example, we found that porous border sealants reduce the lifetime of the device by adsorbing some of the EOM components. Some boarder sealants have exhibited chemical interaction in the form of unwanted discoloration of the liquid crystal near the border seal. In some instances of chemical interaction, the border sealant itself becomes discolored. These interactions are undesirable.

The border sealant can be applied using any technique known in the art, such as a e.g. using brushes, rollers, films or pellets, spray guns, applicator guns, screen printing, inkjet printing, flexographic printing, planar coating, roller pressing, thermal pressing, etc. All of these can be done manually or can be automated into a machine, or a combination thereof. The border sealant can be a suitable adhesive (UV, thermal, chemical, pressure, multi-part epoxies, and/or radiation cured), polyisobutylene or acrylate-based sealants, and so on, or a pressure sensitive adhesive, a two-part adhesive, a moisture cure adhesive, etc. Other types of border (edge) seal can be composed of metallized foil or other barrier foil adhered over the edge of the cell. It has been found that hybrid radiation and thermal cure sealants (i.e. UV curable with thermal post-bake) offer certain advantages. For example, Threebond 30Y-491 material (from Threebond Corporation, Cincinnati, Ohio) is especially useful because of its favorable water vapor barrier properties, low viscosity at elevated temperature for easy depositing of the edge seal material, good wetting characteristics, and manageable curing properties. Those skilled in the art and familiar with advanced sealants will be able to identify other sealants that offer comparable performance.

The cell 10 is filled with an electro-optic material (EOM). The electro-optic material can be any material that is responsive to an electric field applied across the cell so as to have a desired operating characteristic intended for the device and includes any material that can be altered by the application of an electric current or voltage. For example, the EOM may be one or a combination of a liquid crystal material, an electro-chromic material, a suspended particle device (SPD), with other additives such as dyes (dichroic dyes, pleochroic dyes, etc.), and the like, where the electro-optic material can be altered by the application of an electric current or voltage. In a preferred embodiment, the EOM is a guest-host liquid crystal-dichroic dye mixture.

In some embodiments, the electro-optic material as a whole is not polymerizable, non-encapsulated and non-discrete. Thus, the EOM material excludes polymeric or encapsulated liquid crystal compositions such as PDLC, PELC, PSCT, PNLC, NCAP, etc.

As used herein, "not polymerizable" means an EOM composition that does not include any chemical components (e.g. polymer) in an amount necessary to dimensionally stabilize the EOM layer by changing the phase of the material to a solid, a semi-solid, or a gel, etc. A non-polymerizable EOM contains <10% polymerizable material.

"Non-discrete" means an EOM that is not divided into discrete, separate compartments by encapsulation, polymer walls, polymer networks, patterned spacers, or the like.

"Non-encapsulated" means an EOM that is not contained within the confines or interior volume of a capsule. A capsule refers to a containment device or medium that confines a quantity of an EOM material, such as a liquid crystal, so that an "encapsulated EOM" is a quantity of EOM confined or contained in an encapsulating medium, e.g. a polymer capsule. The capsules may have a spherical shape, or may have any other suitable shape. Encapsulated EOM (e.g. encapsulated liquid crystals) are made to prevent them from flowing. Examples of encapsulated EOMs include: polymer-dispersed liquid crystals (PDLCs), which consist of droplets of liquid crystals inside a polymer network.

For example, a method of microencapsulation is described by FERGASON in U.S. Pat. No. 4,435,047 entitled: "Encapsulated liquid crystal and method" (1984) and in Patent Application PCT/US1982/001240 (WO/1983/001016) entitled: "Encapsulated Liquid Crystal and Method." In this method, a resin material is used to encapsulate the liquid crystal (LC) material to form curved, spherical capsules containing discrete quantities of LC material. These are made by mixing together LC material and an encapsulating medium (e.g. resin) in which the LC material will not dissolve and permitting formation of discrete capsules containing LC material. In the micro-encapsulation, the liquid crystal is mixed with a polymer dissolved in water. When the water is evaporated, the liquid crystal is surrounded by the polymer. A large number of tiny "capsules" are produced and distributed through the bulk polymer. Materials manufactured by encapsulation are: referred to as NCAP or nematic curvilinear aligned phase.

There are other methods of preparing PDLCs, PSCTs, PNLC such as phase separation, e.g. Polymerization Induced Phase Separation (PIPS). With PIPS, droplets of LC are excluded from the bulk via phase separation as polymeric chains grow in molecular weight—the LC becomes encapsulated into micron-sized droplets by solid polymer walls. Once encapsulated, the liquid crystal cannot flow between the substrates or leak out if the substrates are cut. This method is described in, for example, Schneider et al., *SID Int. Symp. Digest Tech. Papers*, vol. 36, p. 1568 (2005); and Schneider t. "New Developments in Flexible Cholesteric Liquid Crystal Displays" Emerging Liquid Crystal Technologies II, *Proc. of SPIE*, Vol. 6487, 64870J (2007).

In some embodiments, e.g. where the cell size is large, in addition to the unpatterned spacers, the cell contains one or more Adhesive Gap Control elements or AGCs. An AGC is an adhesive element placed either randomly or in a non-diffracting pattern and assists in the adherence of the two cell substrates.

Figure 9A:
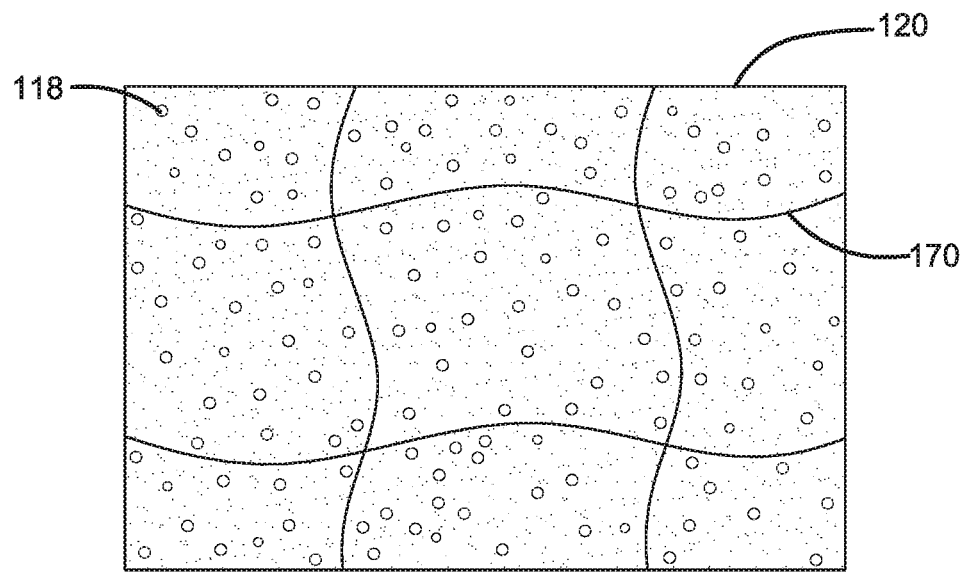
FIGS. 9A-9B are schematic diagrams of an embodiment of a flexible cell unit having adhesive gap control (AGC) elements.
Figure 9B:
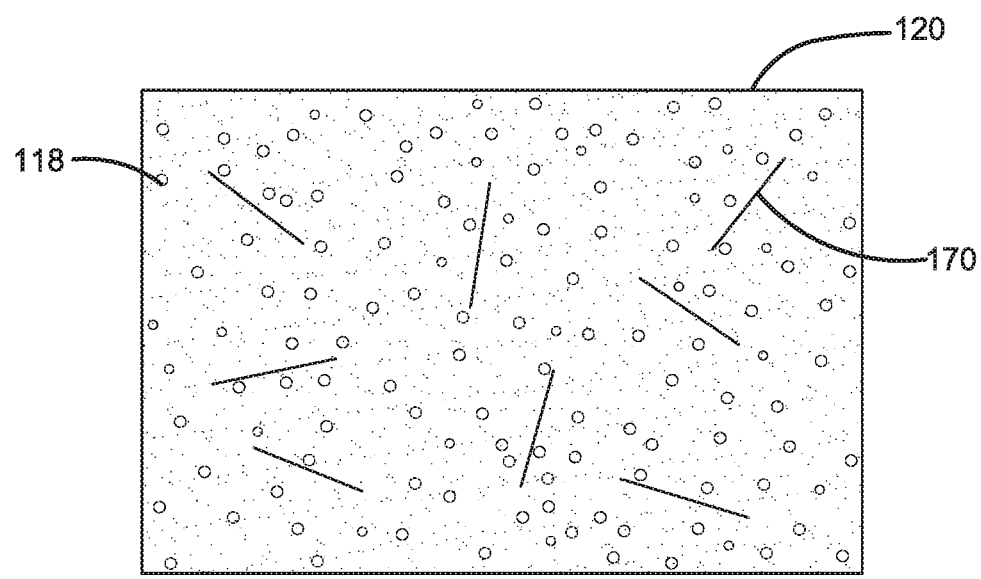

In some embodiments, the AGCs do not coincide with divisions between independently switchable pixels or segments. For example, a device having a single cell unit (as shown in FIGS. 9A and 9B) may contain multiple AGCs. FIG. 9A, shows an embodiment where the AGC elements 170 may be one or more adhesive walls that form a matrix inside the cell unit, but do not divide the cell in terms of its electrical connectivity, i.e. the cell and its EOM is activated by a single electrical connection and the cell or the device as a whole is not pixalated or segmented. FIG. 9B shows walls or other AGC's 170 which are placed in the cell to enhance adhesion of the substrates, but which do not form a matrix that segments the cell 120. Rather, the AGC's 170 are similar to elongated or other shaped adhesive means placed randomly or in a non-diffracting pattern. In FIG. 9A-9B, the border seal 120 surrounds the active area and the AGC elements 170 forms a matrix in a non-diffracting pattern.

In other embodiments, where the conductive layer (e.g. ITO) contains segmented regions, the AGC's may be used to divide the segments (i.e., the AGC's will coincide with the segment borders). In yet other embodiments, where the conductive layer contains segmented regions, the AGCs may not coincide with the ITO segment borders.

AGC elements may be pre-applied to one or more substrates or can be applied during the roll-filling process before, at the same time, or after the border seal is applied. The AGC elements may be cured at the same time or after the border seal is cured, using heat, light or air.

Figure 10A:
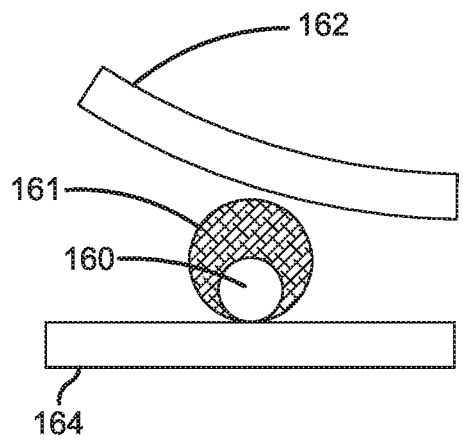
FIGS. 10A-D are schematic diagrams of embodiments of a roll-filling fabrication method where the AGCs are formed during the roll-filling process.
Figure 10B:
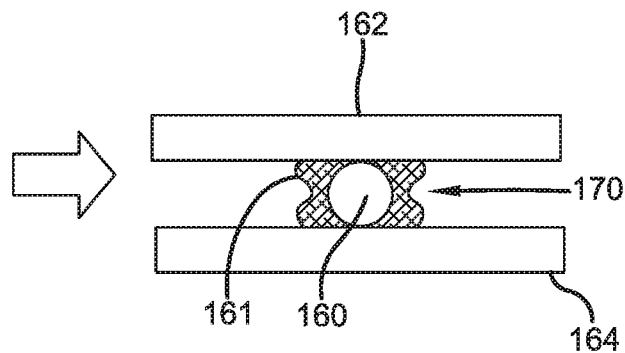

In other embodiments, the AGCs may be spherical (or other shapes known in the art) spacers with adhesive elements capable of adhering the cell's two substrates. FIGS. 10A-B show one example of a spacer 160 and a quantity or "glob" of adhesive material 161 between two substrates 162, 164. During the roll-filling process, the adhesive 161 is pressed down, the spacer 160 maintains the desired controlled distance, and the resultant AGC 170 is formed.

Figure 10C:
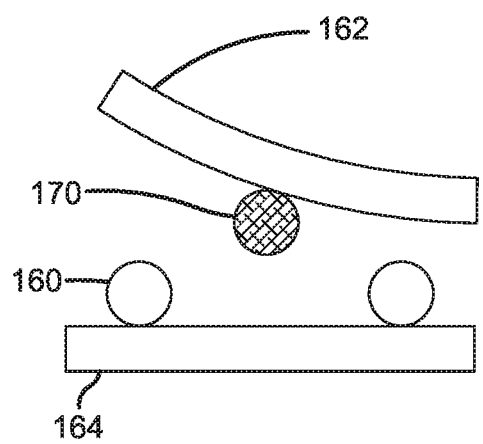
Figure 10D:
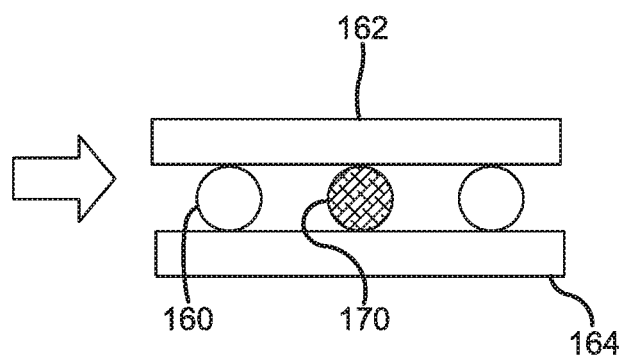

FIGS. 10C-D show another example where the AGC 170 is formed by a quantity of adhesive applied to one substrate 162 while spacers 160 are applied to the other substrate 164. When the substrates are brought together and the cell is roll-filled, the AGC element 170 is situated between spacers 164 (FIG. 10D).

In some embodiments, the EOM includes a "guest-host" liquid crystal-dye mixture where the mixture includes a quantity of one or more dichroic dye "guests" mixed inside a liquid crystal "host" solution. The liquid crystal "host" molecules have an axis of orientation that is alterable by adjustment of a voltage applied across the substrates. The "guest" dye mixture includes one or more dichroic dyes which are dissolved within the liquid crystal host, align with the orientation of the liquid crystal molecules and whose absorption of polarized light strongly depends on the direction of polarization relative to the absorption dipole in the dye molecule. An applied voltage results in a switch between a first state, where the guest-host orientation allows maximum light transmission, referred to here as the "clear state", and a second state, where the guest-host orientation allows minimum light transmission, referred to here as the "dark state", and a combination of intermediate states, between the fully clear and fully dark states. Depending on the composition of the guest-host mixture, the clear state can occur at zero voltage (Off state). Alternatively, the mixture may be formulated so that zero voltage (Off state) corresponds to a dark (min. transmission) state.

Cells containing guest-host liquid crystal-dye mixtures are particularly well-suited for manufacture according to the methods described herein because of their greater tolerance for variation within the cell gap, i.e. the cell is more forgiving and can function well even if the cell gap has slight variations (within acceptable limits such as +/−5%, 10%, 15%, 20%, 25% or even 30% of the spacer diameter) as compared with cells relying on phase retardation, such as polarizer-based LC devices, where the tolerance or variation in cell gap has to be kept to <1%. In some embodiments, the cell gap is maintained by means of unpatterned spacers as well as AGCs.

In some embodiments, the guest-host liquid crystal-dye mixtures described above are used to attenuate light in an optical device. An "optical device" refers to a cell which is a primarily transmissive device through which users can see objects (e.g. a pair of glasses, goggles, visors, or a window).

A device having a clear (maximum transmission) state at zero voltage (Off state) can be achieved, for example, where the guest-host liquid crystal-dye mixture has a homeotropic alignment (i.e. perpendicular to the substrates) when no voltage is applied, the liquid crystal host has negative dielectric anisotropy and the dichroic dyes have positive dichroism (i.e. having maximal absorption when the polarization is parallel to the long molecular axis of the dye molecule and a minimal absorption when the polarization is perpendicular to the long axis). In such a device, when upon application of a voltage (ON state), the guest-host mixture assumes a planar or homogeneous alignment (i.e. parallel to the substrates) and becomes maximally light absorbing (dark). Such an arrangement can be used in, for example, goggles, eyewear, visors, etc., where it may be desirable to "darken" the device in response to a voltage applied when there is bright light. Other applications include windows (vehicles, buildings, aircrafts, etc.) and sun/moon roofs, etc.

In other examples the reverse alignment can be implemented so that the guest-host liquid crystal-dye mixture can have a planar alignment (homogeneous) in a dark state, when the applied voltage is OFF, and a homeotropic alignment in the clear state when voltage is applied. This can be achieved by use of a planar surface treatment for the alignment layers in conjunction with a dye having positive dichroism and a liquid crystal material with positive dielectric anisotropy. Such an arrangement may be used in, for example, a window or sunroof, where it is desirable for the device to be normally in a "dark" state, but capable of switching to a clear state by application of a voltage.

Finally, the cell 10 may be connected to a control circuit 30 for application of an electric field or voltage across the cell. The voltage source may be either AC or DC.

The cell 10 according to the invention is made using a roll-to-roll or a roll-filling manufacturing process. "Roll-to-roll process" means the entire process the substrates experience, from unwinding from their corresponding roll to manufacture of a cell.

"Roll-filling" process or method means the process of using one or more lamination rollers to bring two substrates together (mate the substrates) and to fill the cell gap with the EOM to form a cell. At least one of the substrates needs to be made of a flexible material Therefore, contemplated herein are also cells being made using the roll-to-roll or the roll-filling process as described herein.

Figure 2A:
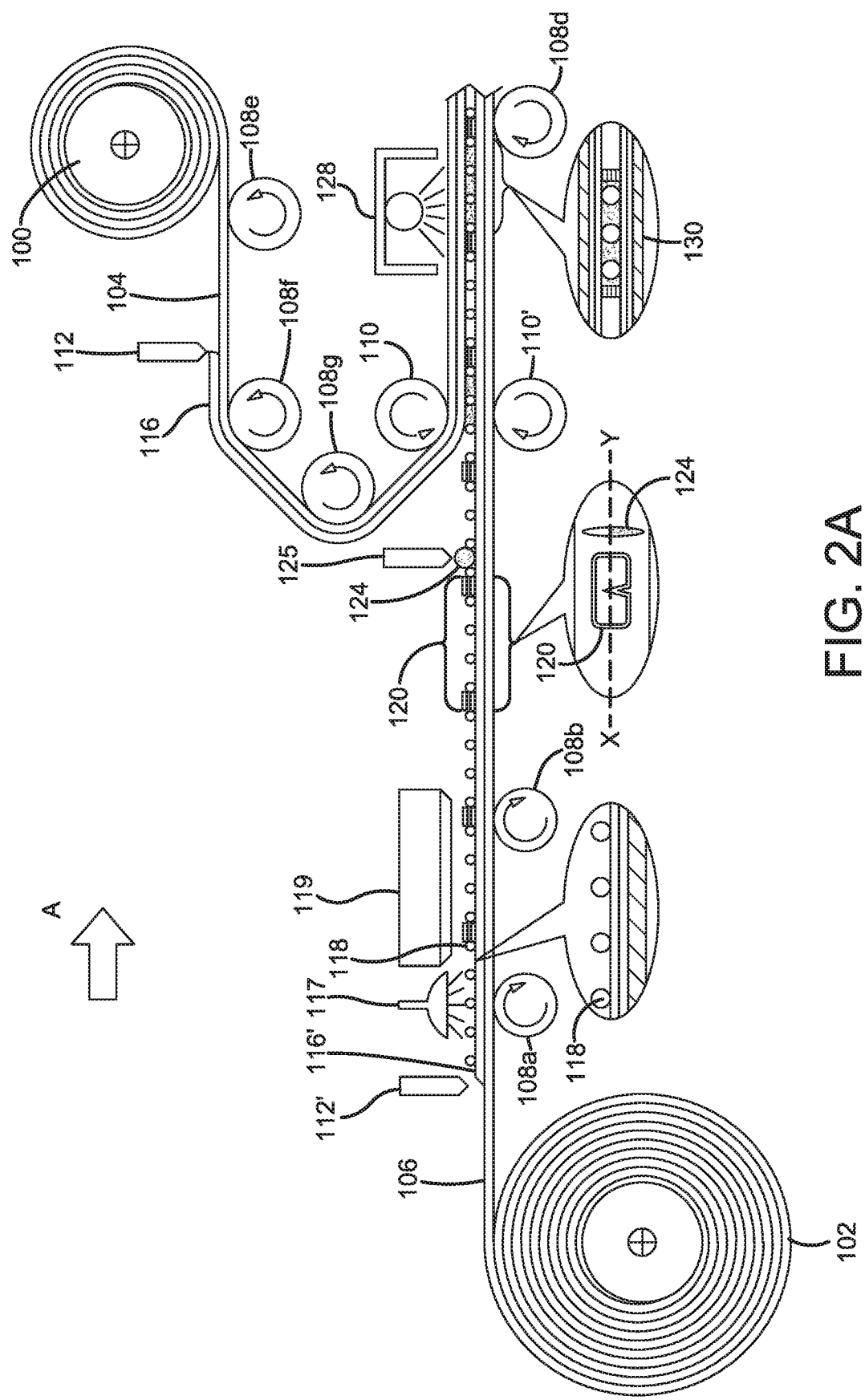
FIG. 2A is a schematic diagram of an embodiment of a roll-filling fabrication method of a flexible cell unit using continuous rolls of flexible substrates where the border sealant is applied before the roll-filling step.

One example of a roll-filling method for making cell 10 using continuous sheets of flexible substrates is illustrated in FIG. 2A. In this example, two rolls of flexible plastic or glass 100, 102, are used to form a top substrate 104 and a bottom substrate, 106, respectively. The continuous sheets 100, 102 are placed onto sets of rollers (108) that rotate and move the sheets towards a set of lamination rollers 110, 110'. Although rollers 108 are shown in this example, it is known in the art that the continuous sheets of flexible substrate can be moved without a need for rollers, e.g. the sheet can "float" between a nip and a tension roller, (not shown) and can be moved along in this fashion without the need for rollers to move it. In this example, each continuous sheet of flexible plastic or glass is previously coated with an ITO conductive layer. A set of applicators 112, 112' is used to apply a polyimide alignment layer 116, 116' onto the top and bottom substrates 104, 106. A spray applicator 117 is used to apply a layer of spherical spacers 118 onto the bottom substrate 106. It is understood by people of skill in the art that in some embodiments, one or more of the sheets 100, 102 can have a pre-applied alignment layer, or pre-applied spacers, or a combination thereof.

FIG. 2A shows the spacers being applied to the bottom substrate, but in other examples, the spacers may be applied to the top substrate, or to both the top and bottom substrates. Spacers may be applied to a single or both rolls of substrate before the roll-to-roll process. Spacers 18 may also be applied during the roll-to-roll process using any method known in the art, including wet or dry spraying, nebulizing, printing or wet coating in solution.

In some examples, the spacers may be embedded in and applied as part of the alignment layer. In yet other examples, the spacers may be embedded in and applied as part of the EOM when the EOM is deposited onto a substrate.

A screen printer 119 prints a border sealant pattern 120 on the bottom substrate 106 as the substrate rolls in direction A. In some embodiments the screen printer is a rotary screen printer and the top substrate, bottom substrate or both top and bottom substrates are printed with a border sealant.

A strip or line of an EOM such as a liquid crystal/dye mixture 124 is deposited onto the bottom substrate 106 close to but outside the area formed by the border sealant 120, using a depositing means 125. Also contemplated herein is a method where the EOM 124 is deposited before the border sealant 120.

The lamination rollers 110, 110' are then used to bring together and "mate" the top substrate 104 and the bottom substrate 106, while the pressure from the rollers pushes the EOM 124 to roll over the border seal 120 and into the "active" area inside the perimeter of the border sealant 120, thus forming a cell 130 filled with the EOM 124. The "mating" of the top and bottom substrates brings the top substrate 104 into contact with the border sealant 120, and into contact with spacers 118, which separate the top and bottom substrates by the width of the spacers. The spacers 118 maintain a controlled distance or "gap" between the top and bottom substrates, which in turn is filled with the EOM 124.

Finally, the border sealant 120 is cured by a curing apparatus 128 and the cell 130 is cut and removed from the rolling plastic sheets. However, it is possible to first cut and separate the cell and then cure the border seal using IN light, heat, pressure, chemical interaction, moisture, or a combination thereof, or any means for curing the border sealant. Sections of mated substrates, containing cells, can be cut into sheets contain cells. The cells can then be cut out by other methods either mechanically or optically. Mechanical means include die cutting, cutting with an x-y razor blade, or scissors, etc. Optical cutting includes laser cutting, etc.

FIG. 2B shows an example of a roll-filling method for making cell 10 using a continuous sheet of flexible plastic or glass 100' being applied onto discrete sheets 150. In this example, a roll of flexible plastic or glass 100' is used to form a top substrate 104' and the discrete sheet 150 is used to form the bottom substrate. The sheets can be pre-applied with an alignment layer (not shown) and/or spacers (118). The border seal 120 can be placed using screen printer 119, or by any other means known in the art. The EOM 124 is deposited onto substrate 150 using a depositing means 125. Lamination roller 110 is used to bring together and mate the two substrates and to "fill" or "roll-fill" the cell by applying pressure to push the EOM 124 over the border seal 120 and into the active area inside the perimeter of the border seal 120.

FIG. 2C shows an example of a roll-filling method for making a cell using discrete sheets 104, 150. In this example, sheet 104 is flexible plastic or glass. Sheet 150 can be flexible or made of non-flexible plastic or glass, such as materials used for traditional flat-screen LCDs or the like). Lamination roller 110 is used to roll-fill the cell with the EOM 124.

The electro-optic material can be deposited on either the inside or the outside of the perimeter of the border seal, as shown in FIG. 3A-3B. In other examples, the EOM may be deposited in various areas both inside and outside the border sealant (FIGS. 3C-3F). The electro-optic material can be selectively deposited in drops, lines, or shapes, as shown in FIGS. 3A-3F.

If part or all of the EOM is deposited outside the border sealant perimeter, pressure from the lamination roller causes the EOM to roll over the border sealant in order to fill the active cell area. Therefore, it is preferable to have minimal interaction between the electro-optic mixture and sealant so one does not interfere with the function of the other.

In all the examples presented here, it is understood that the method can include other steps, such as the step of rubbing one or more substrates in order to align the electro-optic (e.g. liquid crystal) material in a particular direction, as is known in the art.

Border-Less Processing

In another embodiment of the method of manufacture, no border seal is applied before the roll-filling step. Rather, the EOM is applied to the substrate, the substrates are brought together and roll-filled with the EOM, and then the border or edge seal is created by thermal welding, such as laser cutting or laser welding, laminators, etc. as known in the art.

Figure 4:
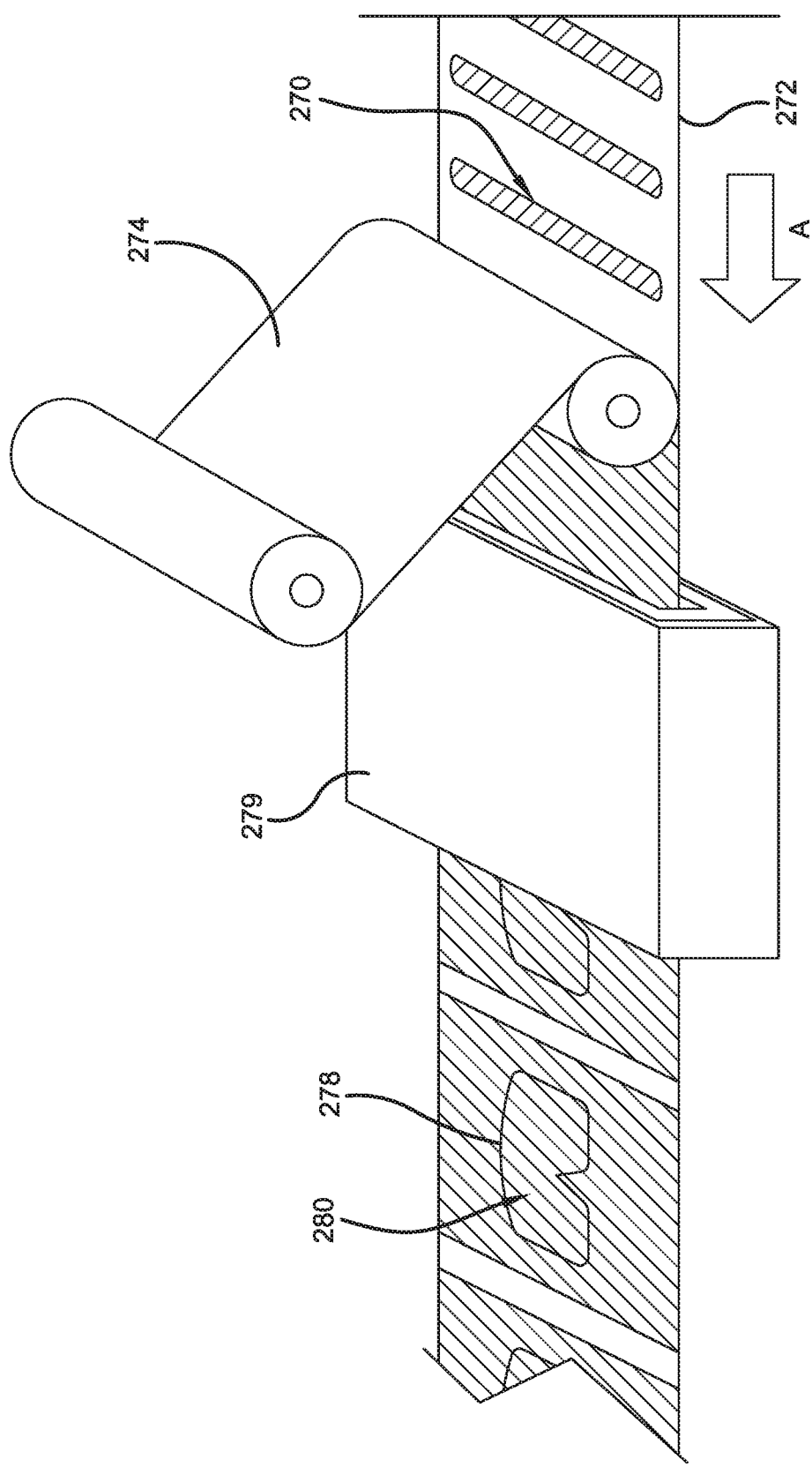
FIG. 4 is a schematic view of another embodiment of a roll-filling method where the border seal is created after the roll-filling step.

One example is shown in FIG. 4 using two rolls of flexible substrate 272, 274. A quantity of an EOM 270 is applied onto the substrate 272, then the two substrates are brought together and roll-filled with the EOM, their separation maintained by spacers on one or both substrates. The step of roll-filling may be performed by a single or by double rollers.

An edge seal 278 is created by a laser-cutting or laser-welding apparatus 279 which acts to cut a shape and create a border seal at the same time, and an EOM-filled flexible cell unit 280 is created and separated from the remainder of the continuous sheet of plastic. Alternatively, a two-step method may be employed where the substrates are first welded together without separating the cell from the mated substrates, and then the cell is cut and/or separated from the remainder of the sheet. The welding step can be performed with a laser, heat, or a combination of both.

Although FIG. 4 shows an example using two rolls of continuous flexible substrates, this method may be practiced using only one roll of flexible substrate and a discrete (non-continuous) sheet to form the two substrates, or using two discrete (non-continuous) sheets to form the flexible substrates, wherein on of the sheets is of a flexible material.

Figure 5A:
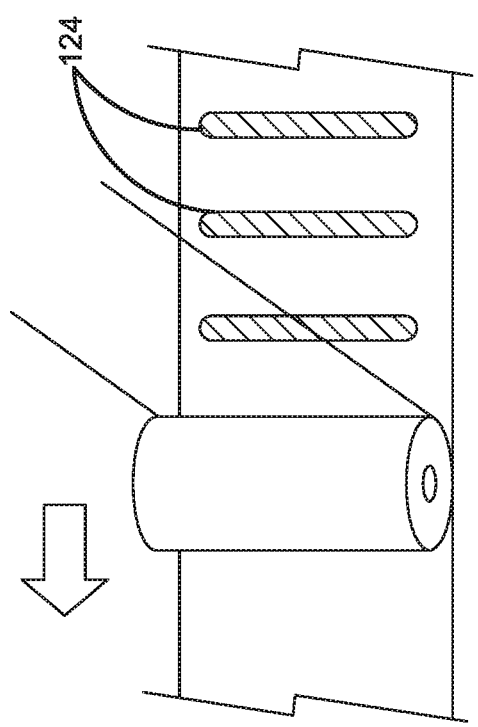
FIGS. 5A-C show examples of various EOM deposition patterns that can be used with the method shown in FIG. 4.
Figure 5B:
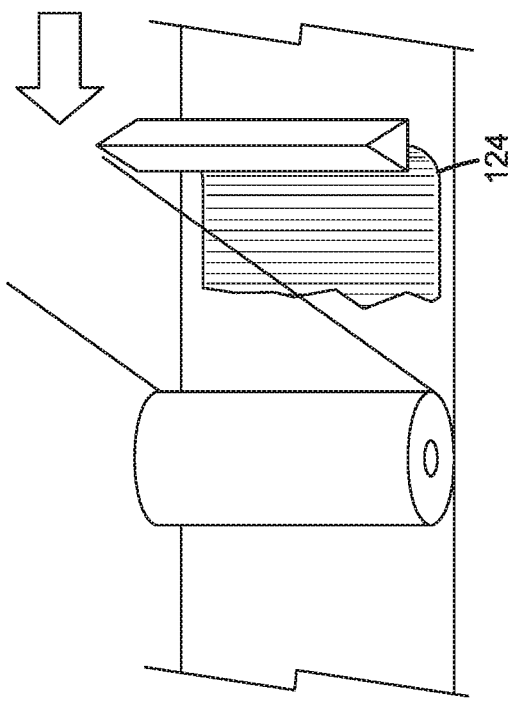
Figure 5C:
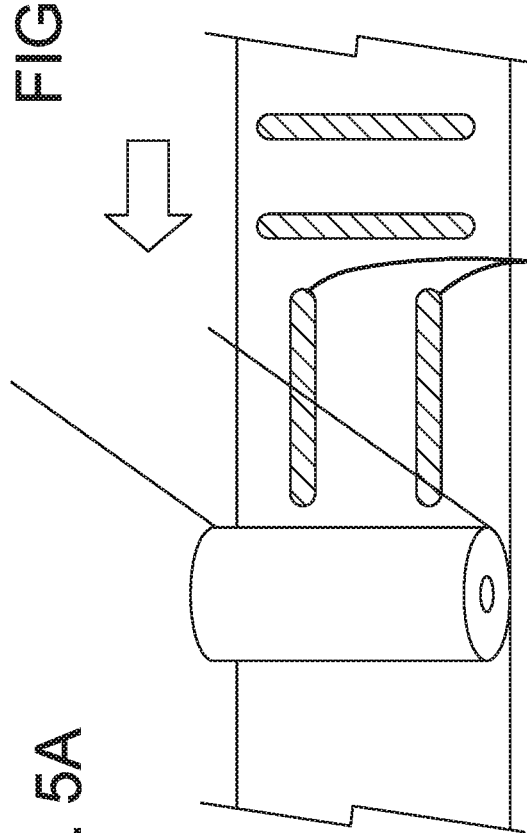

FIGS. 5A-C show various patterns of EOM deposition 124 in a border-less method, for example such as the one shown in FIG. 4. As can be seen, the EOM can be deposited in discrete patterns (FIGS. 5A and 5C) or as a "sheet" covering most of the area on one (or both) substrates (FIG. 5B).

Any of the methods described herein can be used to manufacture any size cell, e.g. from 1 $cm^2$ to 30 $cm^2$ (or any size in between), and including large area devices, i.e. anything having an area greater than 30 $cm^2$, 40 $cm^2$ or 50 $cm^2$ or any cell over 10 cm long, etc. In some examples, the cell has an area greater than 5 $cm^2$ In some embodiments, the process is performed without using a "film guider". A "film guider" is a rigid sheet used to guide, usually the top substrates, into the proper alignment. Such a top film guider is described in Wu et al. "P-55: Cell filling of Flexible Liquid Crystal Displays Using One Line Filling and Tilted Roller Pressing", *SID 07 Digest*, p 393 (2007). However, its use has the disadvantage that such a "guider" can easily touch and scrape the top substrate, therefore scratching it or scraping off coatings such as the conductive and/or alignment layer.

In some embodiments, where the substrates are continuous sheets (or rolls), the method described herein can also be implemented without using a "plate" or carrier to carry one or both substrates. This may be advantageous for example where the cell or device has a large size. For example, in Wu et al., the bottom substrate is fixed to a "stage" or a plate. This plate can be the limiting factor in the size of the cell manufactured. In order to create a large cell (e.g. display, window), a large plate is needed. This can take up valuable space in a clean room environment. Additionally, each different sized cell would require a different size plate. Moreover, using a stage to move the substrate may be problematic in large flexible cell manufacture because the gap between the substrates needs to be maintained constant, with a low variation for the cell to operate correctly. But the stage itself is often not completely flat, so with larger cells, it becomes increasingly difficult to maintain such a low tolerance. When the roll-filling method described here does not use a plate or stage, the movement of the plastic substrates is made possible by the movement of the rollers. Therefore, the method can be adapted to create various size cells rapidly and easily. For example, one length cell can be made and the very next cell can be a different length, with no retooling steps and no material waste.

In some embodiments for smaller sized cells manufactured using one or more discreet sheets, however, it may be helpful to have a carrier to carry the sheets.

The mating (lamination) step between the two substrates can be achieved using one or two rollers. When using two rollers, the pressure and or gap between the two rollers is used to laminate the two substrates. The rollers can be made from rubber, metal or a combination thereof where, for example, one roller has a rubber and the other roller has a metal outer layer. It is well known in the art that in roll-filling fabrication, the diameter of the roller and plastic strength must be tuned to avoid damage.

In some embodiments, the lamination or roll-filling process is carried out with an elevated temperature (e.g. the lamination rollers are heated). Heat can be introduced by light or increasing the temperature and can have befits such as help cure the border seal or alter its viscosity, as known in the art.

When the lamination is achieved using a single roller, the tension in the web is the primary source of pressure. In one example, the two substrates are allowed to move around a roller, each, and the lamination pressure is achieved due to the tension on the roll.

In the case where one of both of the substrates are made from discrete sheets, one or more rollers can be used to roll-fill. The tension, pressure, speed, etc. will be adjusted depending on the flexibility of the substrates, the spacer density, presence of AGCs, viscosity of EOM, cell gap, whether one or two discrete sheets are used, etc.

The substrates may be prelaminated to a protective film for protection against scratches from the process, or to increase its thickness or alter the tensile strength. Further, the substrates may be pretreated by functional coatings such as antifog, antireflection, hardcoats, slip layers etc.

In the examples below, we describe how a flexible liquid crystal cell is manufactured according to the method described herein.

Example 1

In one example, two substrates (which may or may not be pre-coated with ITO and alignment layer PT) are placed on a set of rollers, one to form a top substrate and the other forms a bottom substrate as shown in FIG. 2A. The bottom substrate is sprayed with unpatterned spacers, a border sealant is printed onto the bottom substrate, and a line of EOM (e.g. a liquid crystal/dye mixture) is deposited outside the perimeter of the border sealant. One or more rollers are used to bring the top and bottom substrates together and roll-fill the active area inside the perimeter of the border sealant with the EOM. Then the border sealant is cured to form an edge seal, as required.

FIGS. 2B and 2C show other examples where one or both substrates are formed from discrete (non-continuous) sheets, at least one of which is flexible.

Example 2—Single Roller

Figure 6:
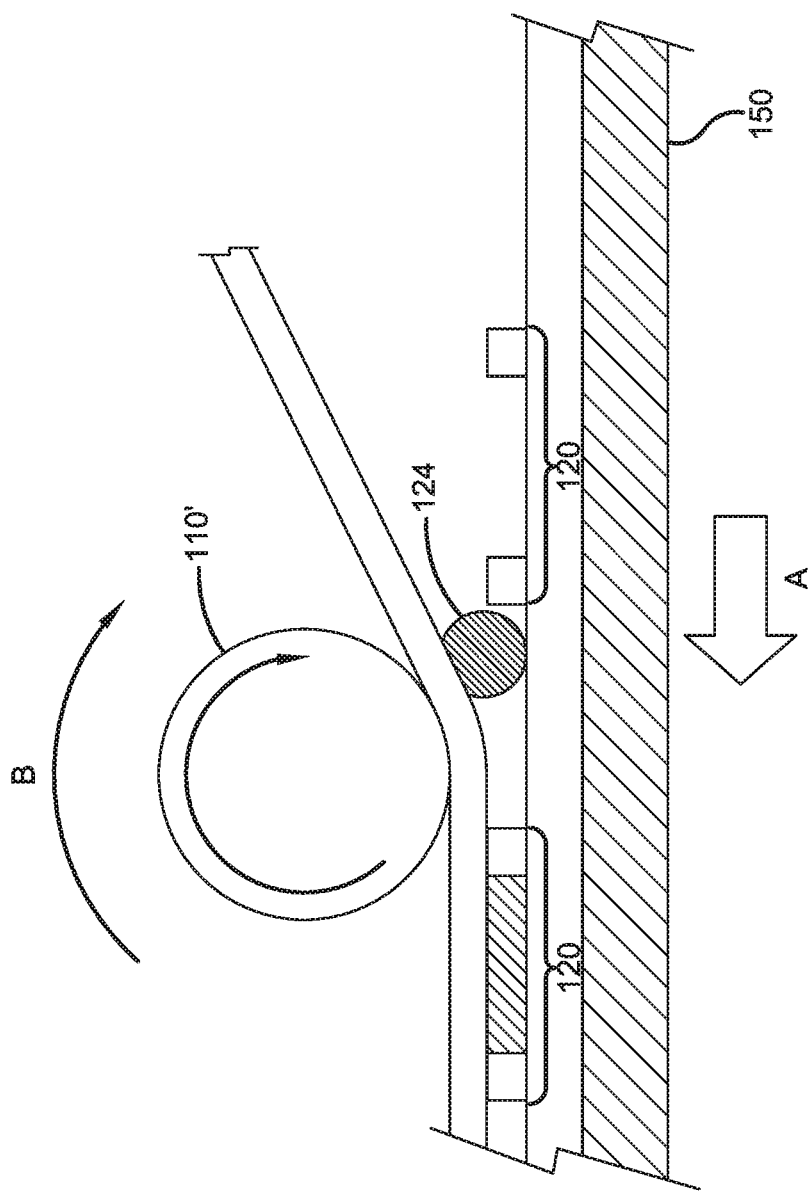
FIG. 6 is a schematic view of an example of a single roller roll-filling method.

In another example, shown in FIG. 6, the bottom substrate may be placed onto and fixed to a moving plate 150 and a single roller (110') used to roll-fill the cells 120. In this example, either the moving roller 110' can cause the movement of the plate and/or the bottom substrate in direction A, or the moving plate 150 moves the bottom substrate and causes the roller to roll in direction B, pairing the substrates and roll-filling the cell.

Example 3—Double Rollers (Top and Bottom)

Figure 7:
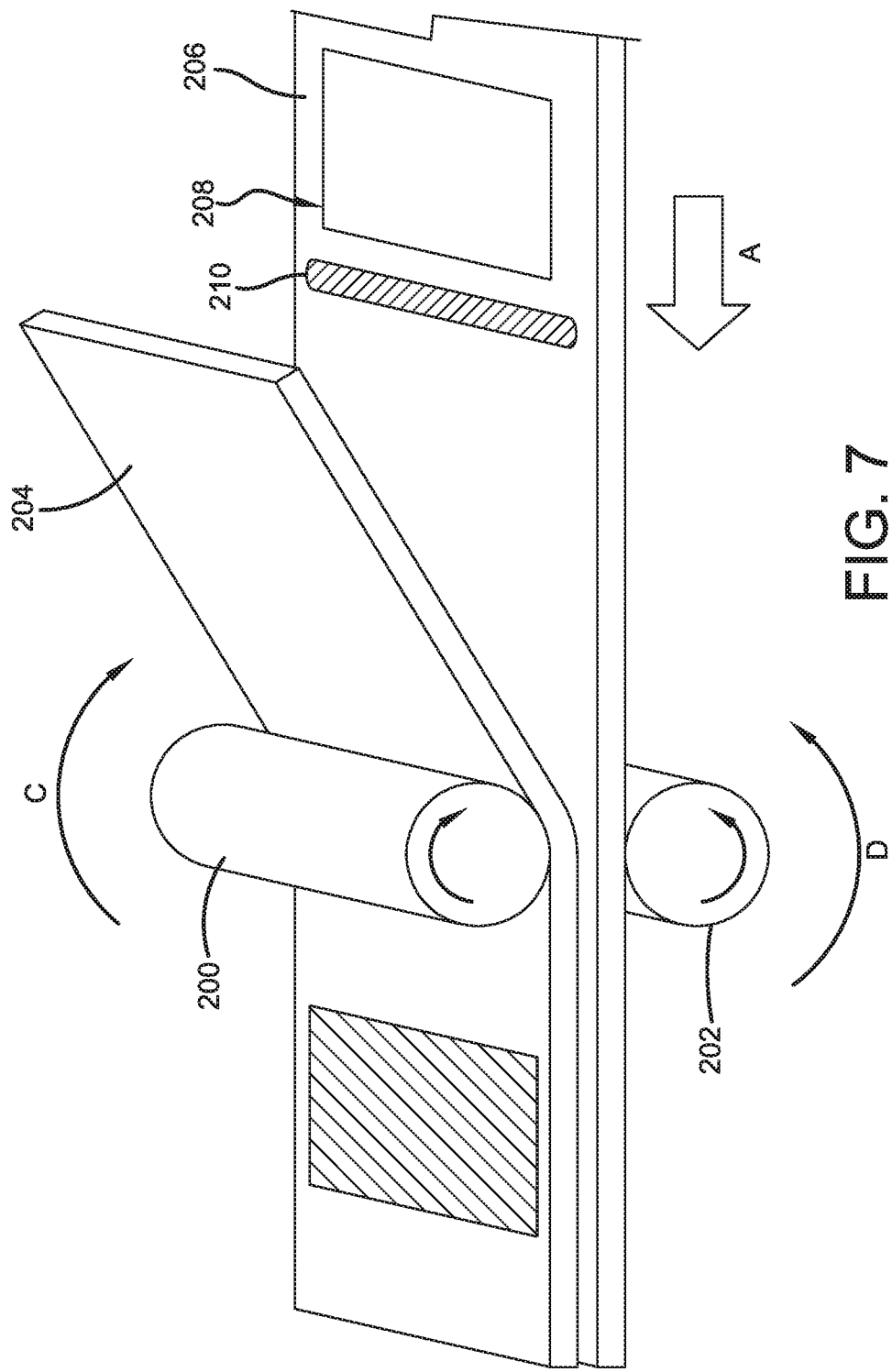
FIG. 7 is a schematic view of an example of a double roller roll-filling method.

In this example (FIG. 7), a set of top and bottom rollers 200, 202 are used to mate or pair the top flexible substrate 204 to the bottom flexible substrate 206. A border sealant 208 is applied to the bottom substrate 206. The rollers 200, 202, pull the flexible substrates though the rollers in the web direction A by running in a clockwise (200) and anti-clockwise (202) direction, respectively. While rolling, the deposited electro-optic mixture 210 simultaneously fills the controlled gap created between the two substrates 204, 206, while they are being paired.

This method can be adopted in a continuous roll-to-roll type process. The amount of OEM deposited on the substrates need not be so carefully gauged as the process also works when more OEM is used, resulting in a quantity of EOM flowing over the border seal during the roll-filling step. This is an advantage over prior methods of manufacture, which required deposition of a very precise amount of OEM required to fill the cell such that the cell would be completely filled but the border sealant would only minimally touch the LC.

Example 4—Double Roller (Left and Right)

Figure 8:
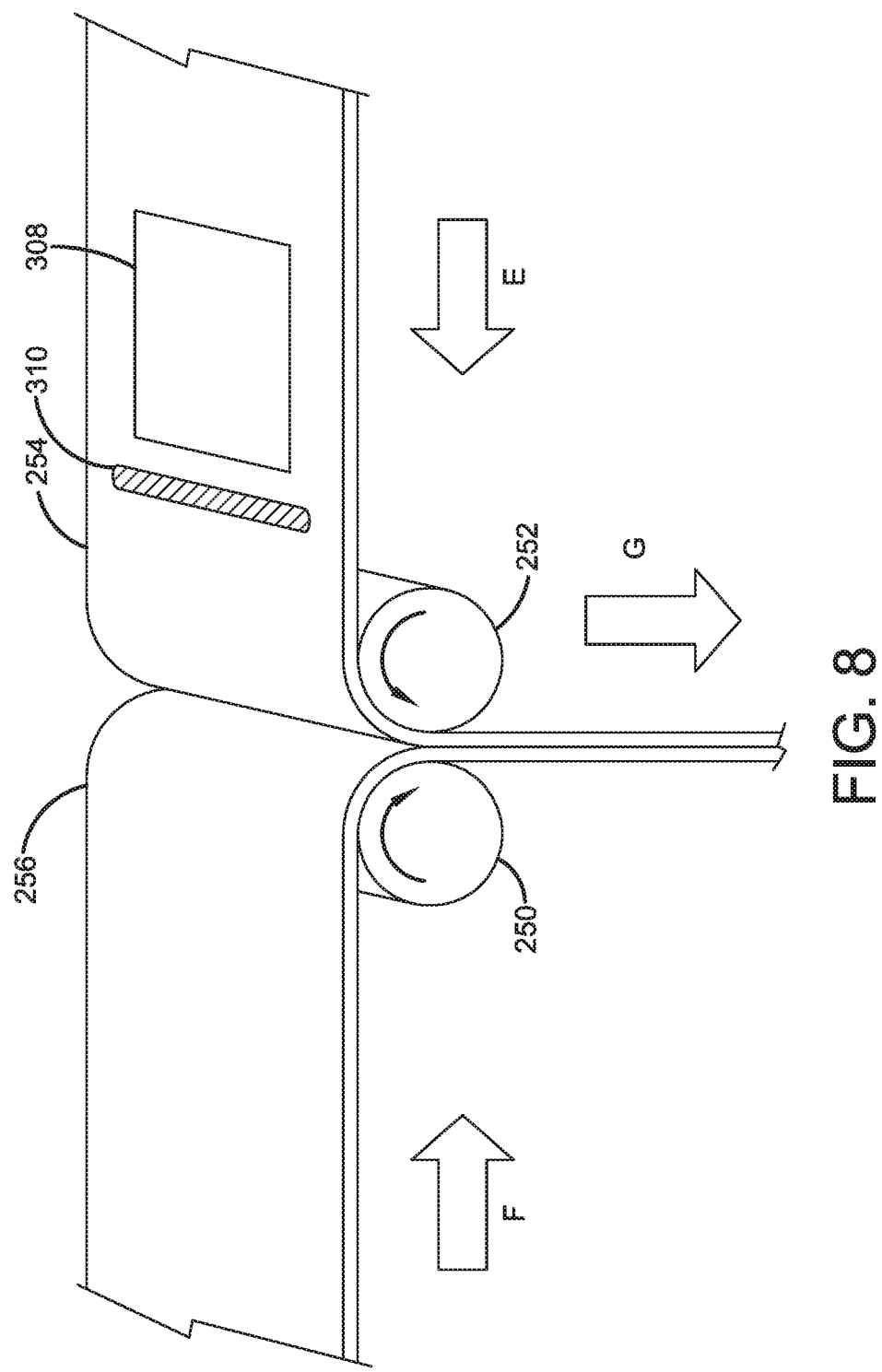
FIG. 8 is a schematic view of an example of a vertical roll-filling method.

In this example, a set of left and right rollers 250, 252, are used to pair the flexible substrate 254 with flexible substrate 256 while moving the substrates in a vertical downward direction (FIG. 8).

Essentially the top and bottom rollers from the previously described method are now placed side by side. The difference is that in this new arrangement, the substrates 254, 256, come together from two different horizontal directions E and F, respectively. The rollers pull the flexible substrates though the rollers in the web direction G, which is vertically downwards. While rolling, the deposited EOM simultaneously fills the controlled gap created between the two substrates while they are being paired, as described previously. This set-up would make it easier to print or pattern any alignment layer on the substrates, and/or allow additional processing steps to be performed on one or both plastic sheets/substrates.

Example 5

In another example, two rolls of substrate are each placed on rollers. For example, each roll is 3 mil PET from Mitsubishi plastics. The substrate rolls are pre-coated with a conductive layer, ITO, by Materion. The ITO coated substrates are then coated with a polyimide alignment layer, 5661 from Nissan Chemicals. Shinshikyu EW plastic spheres, 6 micron in diameter (Hiko Industrial Ltd, Hong Kong) are mixed into the polyimide during the coating process and are present in at least one of the substrate rolls. The rollers unwind the rolls of substrate during the roll-to-roll process. One unwound roll becomes the top substrate, the second becomes the bottom substrate. The substrates move though the roll-to-roll process at a web speed from about 0.5 inches per second to about 10 inches per second. Each substrate has a corresponding border sealant printer. In this case these printers are rotary screen printers. The rotary screen printers print the border sealant, Loctite 3108, on each of the active surfaces of the top and bottom substrate. Active surfaces are the surfaces that will be in contact with the EOM in the finished cell. A rotary printer will print a border sealant at a height from about 5 microns to about 100 microns, preferably from about 5 microns to about 40 microns. After rotary printing, EOM is deposited on the active surface of the bottom substrate by a syringe and needle dispenser. The EOM is a guest-host dichroic dye-liquid crystal mixture, AMI 577 (AlphaMicron, Inc, Kent, Ohio). A set of top and bottom lamination rollers mate the top and bottom substrates together such that the top border sealant is aligned with the bottom border sealant and the EOM makes contact with both top and bottom active surfaces and though the roll-filling process, fills the entire interior border sealant area. The lamination rollers are configured to be pressure rollers that apply constant pressure across the substrate during the lamination, or configured to be set-gap rollers where the top lamination roller is spaced at a set distance from the bottom lamination roller and allows the top and bottom substrates to mate without compressing the controlled gap and spacers between the top and bottom substrate. The mated substrates are cured after lamination by UV radiation, heat, or a combination of UV and thermal cure. The cured substrates are then cut from the roll into sheets for additional processing.

The invention claimed is:

1. A cell unit comprising:
    first and second substrates separated by a controlled distance maintained by spacers within the cell unit, filled with an electro-optic material and enclosed by a border seal, said cell unit produced using a method of manufacture comprising:
    providing two sheets of material to form the first and second substrates wherein at least one of the sheets is flexible,
    depositing the electro-optic material on at least one said substrate on an area outside the perimeter of said border seal, and
    roll-filling the cell by using one or more lamination rollers to pair the first and second substrates to within the controlled distance of each other and filling said controlled distance with said electro-optic material.

2. The cell unit of claim 1, wherein the electro-optic material is non-discrete non-encapsulated, non-polymeric, and contains less than 10% polymerizable material.

3. The cell unit of claim 1, wherein the spacers are unpatterned.

4. The cell unit of claim 1, wherein one or both of the substrates further comprise an alignment layer and the spacers are deposited inside the alignment layer.

5. The cell unit of claim 1, wherein the cell further comprises adhesive gap control (AGC) means comprising one or more elements selected from polymeric or adhesive bridges, partition walls, pillars, or a combination thereof.

6. The cell unit of claim 1, wherein the cell is an optical device having a haze value less than 8%.

7. The cell unit of claim 1, wherein the electro-optic material is a guest-host dichroic dye-liquid crystal mixture.

8. The cell unit of claim 1, wherein the cell comprises multiple border sealants on the first, or the second, or both substrates.

9. The cell unit of claim 1, wherein said border seal is formed by applying a border sealant and wherein the ratio of border sealant viscosity to the electro-optic material viscosity is greater than 10.

10. A method of producing a cell unit comprising first and second substrates separated by a controlled distance maintained by spacers within the cell unit, filled with an electro-optic material and enclosed by a border seal, the method comprising:
    providing two sheets of material to form the first and second substrates wherein at least one said sheet is flexible,
    depositing the electro-optic material on at least one said substrate on an area outside the perimeter of said border seal, and
    roll-filling the cell unit by using one or more lamination rollers to pair the first and second substrates to within the controlled distance of each other and filling said controlled distance with said electro-optic material.

11. The method of claim 10, wherein the electro-optic material is non-discrete non-encapsulated, non-polymeric, and contains less than 1% polymerizable material.

12. The method of claim 10, wherein the spacers are unpatterned and have a diameter of 3-100 µm in size.

13. The method of claim 10, wherein the method further comprises applying a plurality of unpatterned spacers to the first substrate, the second substrate or both.

14. The method of claim 10, wherein one or both of the substrates further comprise an alignment layer and the method further comprises depositing the spacers inside or as part of the alignment layer.

15. The method of claim 10, wherein the method further comprises placing adhesive gap control (AGC) means on at least one said substrate, wherein the AGC means comprise one or more elements selected from polymeric or adhesive bridges, partition walls, pillars, or a combination thereof.

16. The method of claim 10, wherein the cell is an optical device having a haze value less than 8%.

17. The method of claim 10, wherein the electro-optic material is a guest-host dichroic dye-liquid crystal mixture.

18. The method of claim 10, wherein the border seal perimeter has at least one opening during the roll-filling step.

19. The method of claim 10, wherein the method further comprises applying multiple border sealants on the first, or the second, or both substrates.

20. The method of claim 10, wherein the border seal is formed by applying a border sealant and wherein the ratio of border sealant viscosity to the electro-optic material viscosity is greater than 10.

21. The method of claim 10, wherein the method is vacuum-less.

22. A method of producing a flexible cell unit enclosed by a border seal and filled with an electro-optic material, the flexible cell unit having a first substrate and a second substrate separated by a controlled distance maintained by a plurality of unpatterned spacers within the flexible cell unit, the method comprising:
   providing two sheets of flexible material as the first and second substrates,
   depositing an electro-optic material on at least one substrate, wherein the electro-optic material is non-discrete non-encapsulated, non-polymeric, and contains less than 1% polymerizable material; and
   pairing the first and second substrates while roll-filling the flexible cell unit with the electro-optic material using one or more lamination rollers while the electro-optic material maintains its ability to be altered by application of an electric current or voltage so that the electro-optic material completely fills the controlled distance between the first and second substrates, wherein the controlled distance is maintained by the unpatterned spacers.

23. The method of claim 22, wherein the method further comprises applying a plurality of unpatterned spacers to the first substrate, the second substrate or both.

24. The method of claim 22, wherein one or both of the substrates further comprise an alignment layer and the method further comprises depositing the spacers inside or as part of the alignment layer.

25. The method of claim 22, wherein the method further comprises placing adhesive gap control (AGC) means on at least one said substrate, wherein the AGC means comprise one or more elements selected from polymeric or adhesive bridges, partition walls, pillars, or a combination thereof.

26. The method of claim 22, wherein the electro-optic material is a guest-host dichroic dye-liquid crystal mixture.

27. The method of claim 22, wherein the method further comprises applying a border sealant on the first or second or both substrates before the roll filling step and curing the border sealant to form the border seal after the roll-filling step.

28. The method of claim 22, wherein the electro-optic material is deposited on an area outside the perimeter of the border sealant, an area inside the perimeter of the border sealant, or one or more areas both inside and outside the perimeter of the border sealant.

29. The method of claim 22, wherein the border seal perimeter has at least one opening (i.e. is not complete) during the roll-filling step.

30. The method of claim 22, wherein the method is vacuum-less.

31. A cell unit manufactured according to the method in claim 22.

* * * * *